US012638748B2

(12) United States Patent
Lee et al.

(10) Patent No.: US 12,638,748 B2
(45) Date of Patent: May 26, 2026

(54) CAMERA ACTUATOR AND CAMERA DEVICE COMPRISING SAME

(71) Applicant: LG INNOTEK CO., LTD., Seoul (KR)

(72) Inventors: Jun Taek Lee, Seoul (KR); Young Ho Kim, Seoul (KR); Kyoung Ho Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 150 days.

(21) Appl. No.: 18/290,848

(22) PCT Filed: Aug. 8, 2022

(86) PCT No.: PCT/KR2022/011770
§ 371 (c)(1),
(2) Date: Jan. 22, 2024

(87) PCT Pub. No.: WO2023/018145
PCT Pub. Date: Feb. 16, 2023

(65) Prior Publication Data
US 2025/0102882 A1      Mar. 27, 2025

(30) Foreign Application Priority Data
Aug. 9, 2021    (KR) ........................ 10-2021-0104572

(51) Int. Cl.
*G03B 5/04*       (2021.01)
*G03B 17/12*      (2021.01)

(52) U.S. Cl.
CPC .............. *G03B 5/04* (2013.01); *G03B 17/12* (2013.01); *G03B 2205/0023* (2013.01); *G03B 2205/0069* (2013.01)

(58) Field of Classification Search
None
See application file for complete search history.

(56) References Cited

U.S. PATENT DOCUMENTS 4,839,543 A * 6/1989 Beakley ............... H02K 41/031
                                                        318/135
2019/0377155 A1* 12/2019 Bachar ................... G02B 7/102
(Continued)

FOREIGN PATENT DOCUMENTS

CN        102237775 A  * 11/2011
JP      2005176464 A  * 6/2005
(Continued)

OTHER PUBLICATIONS

International Search Report dated Nov. 10, 2022 issued in Application No. PCT/KR2022/011770.

*Primary Examiner* — Rodney E Fuller
(74) *Attorney, Agent, or Firm* — KED & ASSOCIATES

(57) ABSTRACT
A camera actuator including a housing; a first lens assembly and a second lens assembly which are moved in an optical axis direction on the basis of the housing; a driver which moves the first lens assembly and the second lens assembly; and ball portions arranged between the first lens/assembly and the housing and between the second lens assembly and the housing. The driver includes a driving coil, and a driving magnet facing the driving coil. The driving magnet includes an upper magnet, and a lower magnet arranged on the lower portion of the upper magnet. The driving coil includes an upper coil facing the upper magnet, and a lower coil facing the lower magnet. The upper magnet and the lower magnet are arranged between the upper coil and the lower coil and are coupled to one of the first lens assembly and the second lens assembly.

20 Claims, 21 Drawing Sheets

PATH

CV    1100        1200        1300

A                                      A'

X
Y ← → Z

(56)          References Cited

U.S. PATENT DOCUMENTS

| | | | |
|---|---|---|---|
| 2020/0174270 A1* | 6/2020 | Enta ..................... | G02B 27/646 |
| 2021/0075939 A1* | 3/2021 | Byon ....................... | G03B 5/00 |
| 2021/0092264 A1* | 3/2021 | Kang .................... | G03B 13/36 |
| 2021/0231904 A1* | 7/2021 | Son ........................ | G03B 30/00 |
| 2021/0302687 A1* | 9/2021 | Jang ........................ | G02B 7/04 |
| 2021/0373278 A1* | 12/2021 | Kim ....................... | G03B 30/00 |
| 2022/0171157 A1* | 6/2022 | Roh ........................ | G03B 5/00 |
| 2022/0279125 A1* | 9/2022 | Jang ...................... | H04N 23/54 |

FOREIGN PATENT DOCUMENTS

| | | |
|---|---|---|
| JP | 2021-076789 | 5/2021 |
| KR | 10-2019-0034876 | 4/2019 |
| KR | 10-2020-0015051 | 2/2020 |
| KR | 10-2020-0049907 | 5/2020 |
| KR | 10-2020-0119630 | 10/2020 |

* cited by examiner

1000

1200

1252: UC, BC
1221: 1221a, 1221b, 1221c, 1221d
1222: 1222a, 1222b
1253: 1253a, 1253b
1250: 1251, 1252
1251: UM, BM
UM: UM1, UM2
BM: BM1, BM2
1270: 1271, 1272

<u>1232</u>

<u>1232</u>

1300

CAMERA ACTUATOR AND CAMERA DEVICE COMPRISING SAME

CROSS-REFERENCE TO RELATED PATENT APPLICATIONS

This application is a U.S. National Stage Application under 35 U.S.C. § 371 of PCT Application No. PCT/KR2022/011770, filed Aug. 8, 2022, which claims priority to Korean Patent Application No. 10-2021-0104572, filed Aug. 9, 2021, whose entire disclosures are hereby incorporated by reference.

TECHNICAL FIELD

The present invention relates to a camera actuator and a camera device including the same.

BACKGROUND ART

A camera is a device for taking pictures or videos by capturing images of subjects and is mounted on mobile devices, drones, vehicles, or the like. A camera device or a camera module may have an image stabilization (IS) function of correcting or preventing an image shake caused by a user's motion, an auto focusing (AF) function of aligning a focal length of a lens by automatically adjusting a distance between an image sensor and the lens, and a zooming function of capturing an image of a remote subject by increasing or decreasing the magnification of the remote subject through a zoom lens in order to improve the quality of the image.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to a general OIS technique, the motion of the camera may be detected through a gyro sensor or the like, and a lens may tilt or move, or a camera device including the lens and an image sensor may tilt or move based on the detected motion. When the lens or the camera device including the lens and the image sensor tilts or moves for OIS, it is necessary to additionally secure a space for tilting or moving around the lens or the camera device.

Meanwhile, an actuator for the OIS may be disposed around the lens. In this case, the actuator for the OIS may include actuators, which are in charge of tilting of two axes perpendicular to an optical axis Z, that is, an actuator in charge of an X-axis tilting and an actuator in charge of a Y-axis tiling.

However, according to the needs of ultra-slim and ultra-small camera devices, there is a large space constraint for arranging the actuator for the OIS, and it may be difficult to ensure a sufficient space where the lens or the camera device including the lens and the image sensor itself may tilt or move for the OIS. In addition, as the camera has a higher pixel density, it is preferable that a size of the lens be increased to increase the amount of received light, and there may be a limit to increasing the size of the lens due to a space occupied by the actuator for the OIS.

In addition, when the zooming function, the AF function, and the OIS function are all included in the camera device, there is a problem that an OIS magnet and an AF or zoom magnet are disposed close to each other to cause magnetic field interference.

In addition, a need to implement a long stroke for high magnification or the like is also increasing at the same time while a need for miniaturized camera devices is increasing.

DISCLOSURE

Technical Problem

The present invention is directed to providing a camera actuator and a camera device, which allow positions of a driving magnet and a driving coil of a lens assembly to be adjusted to implement a long stroke and miniaturization.

In addition, the present invention is directed to providing a camera actuator and a camera device, which may remove a counter electromotive force generated by a coil spaced apart in an optical axis direction through upper and bottom coils and have high driving efficiency.

In addition, the present disclosure is directed to providing a camera actuator and a camera device, which have improved reliability by increasing a coupling strength between driving magnets.

In addition, the present invention is directed to providing a camera actuator and a camera device, which have an increased moving distance for auto focusing (AF) in order to implement high-magnification zoom.

The objects of embodiments are not limited thereto and may also include objects or effects that may be identified from the configurations or embodiments to be described below.

Technical Solution

One aspect of the present invention provides a camera actuator including a housing, a first lens assembly and a second lens assembly configured to move in an optical axis direction with respect to the housing, a driving unit configured to move the first lens assembly and the second lens assembly, and a ball unit disposed between the first lens assembly and the housing and between the second lens assembly and the housing, wherein the driving unit includes a driving coil and a driving magnet facing the driving coil, the driving magnet includes a first magnet and a second magnet, the driving coil includes a first coil facing the first magnet and a second coil facing the second magnet, and the first magnet and the second magnet are disposed between the first coil and the second coil and coupled to any one of the first lens assembly and the second lens assembly.

The housing may include a base, a first extension portion extending in a direction perpendicular to the base, and a second extension portion extending inward from the first extension portion.

The second extension portion may overlap the base in a vertical direction.

The driving coil may be disposed between the base and the second extension portion.

The first coil may be seated on a lower surface of the base, and the second coil may be seated on an upper surface of the second extension portion.

The second extension portion may include a first ball recess in a lower surface thereof.

The first lens assembly and the second lens assembly may include a second ball recess facing the first ball recess.

The first ball recess may include a stopper.

The ball unit may be positioned in the first ball recess and the second ball recess.

The camera actuator may include a coil yoke disposed on any one of the base, the second extension portion, the first lens assembly, and the second lens assembly.

The camera actuator may include a magnet yoke coupled to the first lens assembly or the second lens assembly and extending outward.

The magnet yoke may be disposed between the base and the second extension portion.

At least a portion of the magnet yoke may overlap the base and the second extension portion in the vertical direction.

The first magnet may be disposed on the magnet yoke, and the second magnet may be disposed under the magnet yoke.

The first magnet may include a first magnet region and a second magnet region disposed sequentially in the optical axis direction, and the second magnet may include a third magnet region and a fourth magnet region disposed sequentially in the optical axis direction.

The first magnet region and the third magnet region may overlap each other in the vertical direction and have different polarities, and the second magnet region and the fourth magnet region may overlap each other in the vertical direction and have different polarities.

A length of the driving magnet in the optical axis direction may be larger than a length of the driving coil in the optical axis direction.

Directions of currents flowing in the first coil and the second coil may be opposite.

The camera actuator may include a ball guide unit in contact with at least a part of the ball unit.

Another aspect of the present invention provides a camera actuator including a housing, a lens assembly configured to move in an optical axis direction with respect to the housing and including a lens, a driving unit configured to move the lens assembly, and a ball unit disposed between the lens assembly and the housing, wherein the driving unit includes a driving coil and a driving magnet facing the driving coil, the driving magnet includes an upper magnet, and a bottom magnet disposed under the upper magnet, the driving coil includes an upper coil facing the upper magnet, and a bottom coil facing the bottom magnet, and at least portions of the upper magnet and the bottom magnet overlap the upper coil, the bottom coil, and the ball unit in a vertical direction and do not overlap the lens in the vertical direction.

Advantageous Effects

According to the present invention, it is possible to implement a camera actuator and a camera device, in which positions of a driving magnet and a driving coil of a lens assembly can be adjusted to implement a long stroke and miniaturization.

In addition, according to the present invention, it is possible to implement a camera actuator and a camera device, which can remove a counter electromotive force generated by a coil spaced apart in an optical axis direction through upper and bottom coils and have high driving efficiency.

In addition, according to the present disclosure, it is possible to implement a camera actuator and a camera device, which have improved reliability by increasing a coupling strength between driving magnets.

In addition, it is possible to implement a camera actuator and a camera device, which have an increased moving distance for auto focusing (AF) in order to implement high-magnification zoom.

Various and beneficial advantages and effects of the present invention are not limited to the above-described contents and will be more readily understood in a process of describing specific embodiments of the present invention.

MODES OF THE INVENTION

Figure 1:
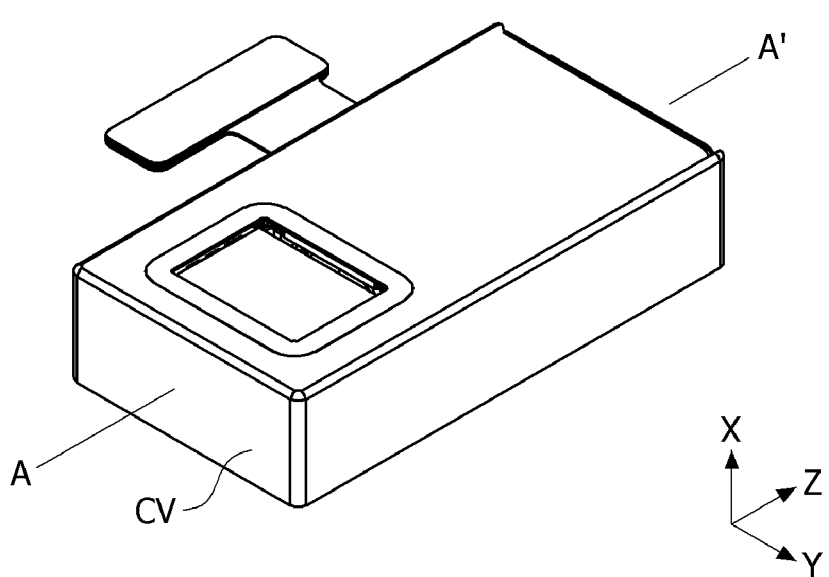
FIG. 1 is a perspective view of a camera device according to an embodiment.

Since the present invention may have various changes and various embodiments, specific embodiments are illustrated and described in the accompanying drawings.

However, it should be understood that this is not intended to limit the present invention to specific embodiments and includes all modifications, equivalents, and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms "comprise" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
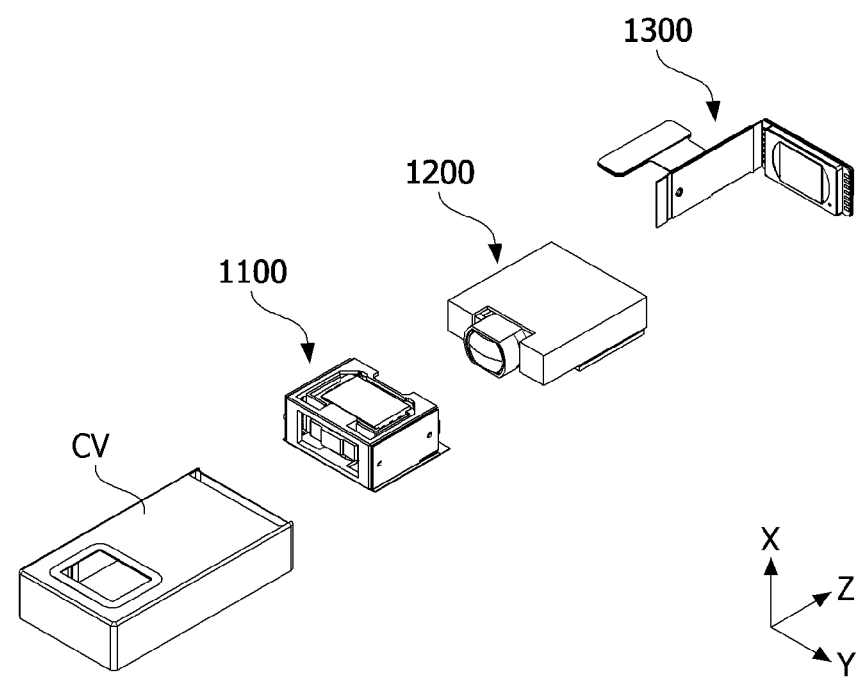
FIG. 2 is an exploded perspective view of the camera device according to the embodiment.
Figure 3:
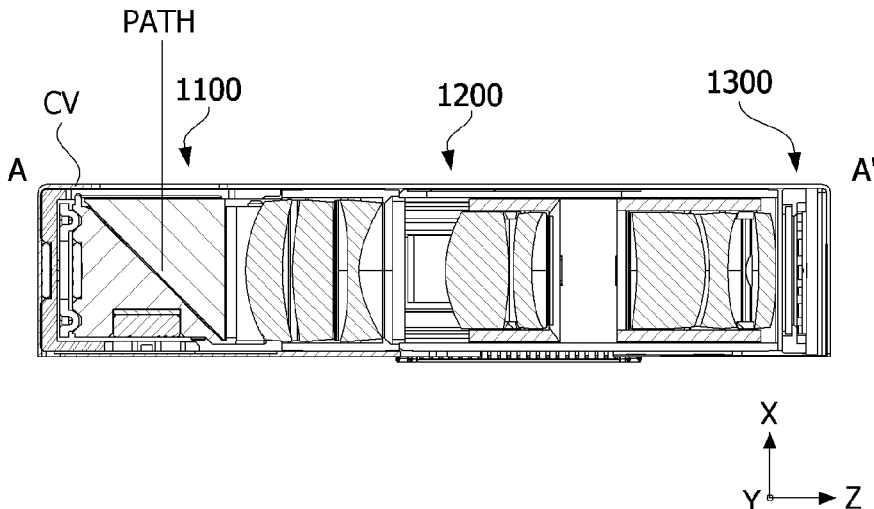
FIG. 3 is a cross-sectional view along line A-A' in FIG. 1.

FIG. 1 is a perspective view illustrating a camera device according to an embodiment, FIG. 2 is an exploded perspective view of the camera device according to the embodiment, and FIG. 3 is a cross-sectional view along line A-A' in FIG. 1.

Referring to FIGS. 1 and 2, a camera device 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

Furthermore, in the specification, the camera device may be referred to as "camera module" or "camera device." Furthermore, the first camera actuator 1100 will be described based on including an optical member accommodated therein or coupled thereto. Likewise, the second camera actuator 1200 will be described based on including at least one lens accommodated therein or coupled thereto. Therefore, the camera device may be composed of first and second camera actuators and an optical member/lens.

The cover CV may cover the first camera actuator 1100 and/or the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

In an embodiment, the first camera actuator 1100 may change an optical path. In an embodiment, the first camera actuator 1100 may vertically change the optical path through an internal optical member (e.g., a prism or a mirror). With this configuration, even when a thickness of a mobile terminal decreases, a configuration of a lens that is larger than the thickness of the mobile terminal is disposed in the mobile terminal so that zooming, auto focusing (AF), and OIS functions may be performed through the change in the optical path.

The first camera actuator 1100 may change the optical path from a first direction to a third direction. In the specification, an optical axis direction is the third direction or a Z-axis direction and corresponds to a traveling direction of light provided to an image sensor.

Additionally, the first camera actuator 1100 may include a fixed focal length lens disposed in a predetermined barrel (not illustrated). The fixed focal length lens may be referred to as "single focal length lens" or "single lens."

The second camera actuator 1200 may be disposed at a rear end of the first camera actuator 1100. The second camera actuator 1200 may be coupled to the first camera actuator 1100. In addition, the mutual coupling may be performed in any of various methods.

In addition, the second camera actuator 1200 may be a zoom actuator or an AF actuator. For example, the second camera actuator 1200 may support one or more lenses and perform an AF function or a zooming function by moving the lenses according to a predetermined control signal of a control unit.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

The circuit board 1300 may be connected to a second housing of the second camera actuator 1200 and may be provided with the image sensor. Furthermore, a base unit including a filter may be seated on the circuit board 1300. A description thereof will be made below.

The camera device according to the embodiment may be formed of one camera device or a plurality of camera devices. For example, the plurality of camera devices may include a first camera device and a second camera device. In addition, as described above, the camera device may be used interchangeably with "camera module," "camera device," "imaging device," "imaging module," "imaging machine," or the like.

In addition, the first camera device may include one actuator or a plurality of actuators. For example, the first camera device may include the first camera actuator 1100 and the second camera actuator 1200.

In addition, the second camera device may include an actuator (not illustrated) disposed in a predetermined housing (not illustrated) and capable of driving a lens unit. Although the actuator may be a voice coil motor, a micro actuator, a silicon actuator, or the like and applied in various methods such as an electrostatic method, a thermal method, a bimorph method, and an electrostatic force method, the present invention is not limited thereto. In addition, in the specification, the camera actuator may be referred to as "actuator" or the like. In addition, the camera device formed of the plurality of camera devices may be mounted in various electronic devices such as a mobile terminal.

Referring to FIG. 3, the camera device according to the embodiment may include the first camera actuator 1100 for performing the OIS function and the second camera actuator 1200 for performing the zooming function and the AF function.

Light may enter the camera device through an opening area positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and enter an image sensor IS positioned at one end of the second camera actuator 1200 (PATH).

In the specification, a lower surface refers to a surface at one side in a first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. Detailed description thereof will be made below. In addition, hereinafter, the optical axis direction corresponds to the optical path and is the third direction (Z-axis direction) in the description of the second camera actuator 1200, and the second camera actuator 1200 will be described below based on this. Furthermore, the optical axis is parallel to the third direction (Z-axis direction), and the first camera actuator 1100 will also be described based on this.

In addition, with this configuration, the camera device according to the embodiment may resolve the spatial limitations of the first camera actuator and the second camera actuator by changing the optical path. In other words, the camera device according to the embodiment may extend the optical path while minimizing the thickness of the camera device in response to the change in the optical path. Furthermore, it should be understood that the second camera actuator may provide a high range of magnification by controlling a focus or the like in the extended optical path.

In addition, the camera device according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, although the first lens assembly and the second lens assembly may be moving lenses that move through the coil, the magnet, and the guide pin, and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF or zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, or shaking correction.

Figure 4:
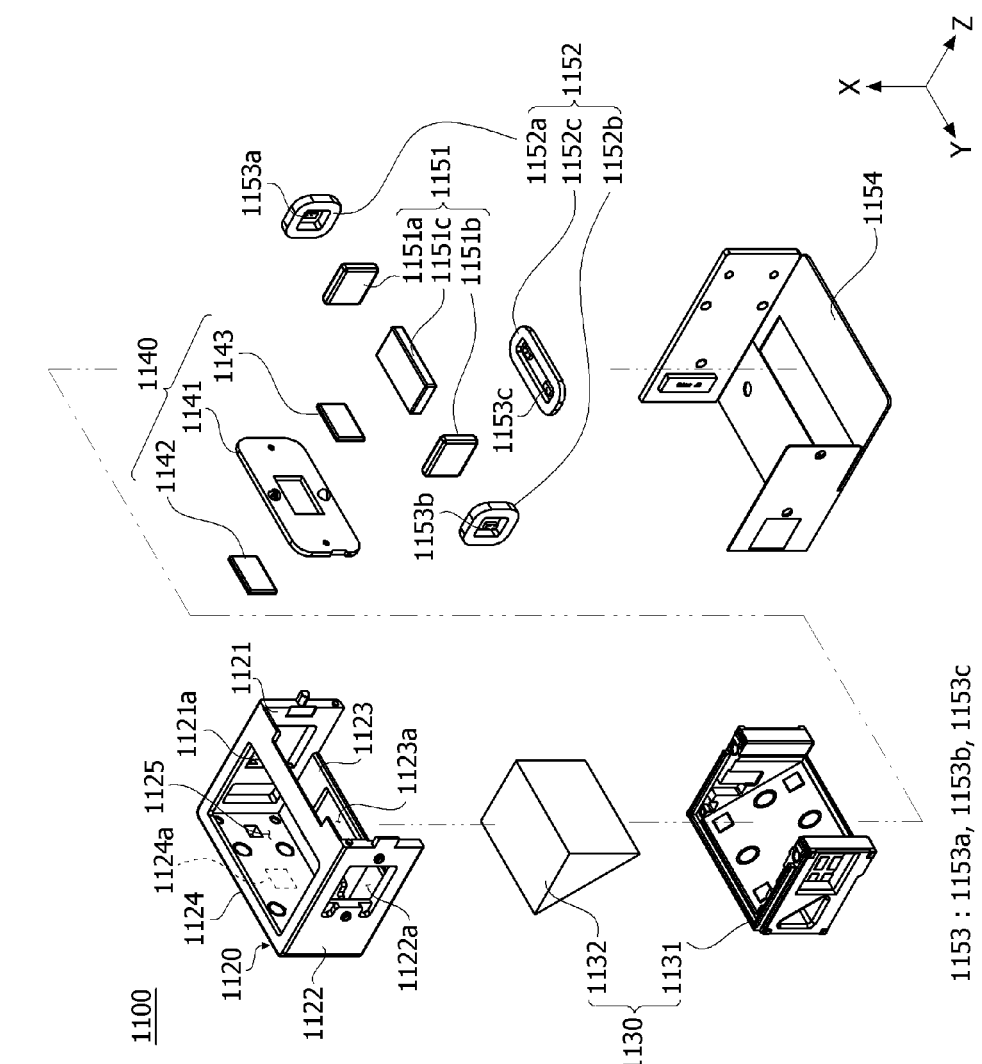
FIG. 4 is an exploded perspective view of a first camera actuator according to the embodiment.

FIG. 4 is an exploded perspective view of a first camera actuator according to the embodiment.

Referring to FIG. 4, the first camera actuator 1100 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnetic part 1142 having a coupling strength with the rotating plate 1141, and a second magnetic part 1143 positioned in the rotating plate 1141. In addition, the first driving unit 1150 includes a first driving magnet 1151, a first driving coil 1152, a Hall sensor unit 1153, and a first board unit 1154.

The first shield can (not illustrated) may be positioned at an outermost side of the first camera actuator 1100 to surround the rotating unit 1140 and the first driving unit 1150, which will be described below.

The first shield can (not illustrated) can block or reduce electromagnetic waves generated from the outside. Therefore, it is possible to reduce the occurrence of malfunction in the rotating unit 1140 or the first driving unit 1150.

The first housing 1120 may be positioned inside the first shield can (not illustrated). In addition, the first housing 1120 may be positioned inside a first board unit 1154 to be described below. The first housing 1120 may be fastened by being fitted into or matched with the first shield can (not illustrated).

The first housing 1120 may be formed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower side portion of the first housing 1120 and may include a lower surface.

In addition, the first housing side portion 1121 may include a first housing hole 1121*a*. A first coil 1152*a* to be described below may be positioned in the first housing hole 1121*a*.

In addition, the second housing side portion 1122 may include a second housing hole 1122*a*. In addition, a second coil 1152*b* to be described below may be positioned in the second housing hole 1122*a*.

The first coil 1152*a* and the second coil 1152*b* may be coupled to the first board unit 1154. In the embodiment, the first coil 1152*a* and the second coil 1152*b* may be electrically connected to the first board unit 1154 so that a current may flow therebetween. The current is an element of an electromagnetic force capable of tilting the first camera actuator with respect to an X-axis.

In addition, the third housing side portion 1123 may include a third housing hole 1123*a*. A third coil 1152*c* to be described below may be positioned in the third housing hole 1123*a*. The third coil 1152*c* may be coupled to the first board unit 1154. In addition, the third coil 1152*c* may be electrically connected to the first board unit 1154 so that a current may flow therebetween. The current is an element of an electromagnetic force capable of tilting the first camera actuator with respect to a Y-axis.

The fourth housing side portion 1124 may include a first housing groove 1124*a*. The first magnetic part 1142 to be described below may be disposed in an area facing the first housing groove 1124*a*. Therefore, the first housing 1120 may be coupled to the rotating plate 1141 by a magnetic force or the like.

In addition, the first housing groove 1124*a* according to the embodiment may be positioned on an inner surface or an outer surface of the fourth housing side portion 1124. Therefore, the first magnetic part 1142 may also be disposed to correspond to a position of the first housing groove 1124*a*.

In addition, the first housing 1120 may include an accommodating part 1125 formed by the first to fourth housing side portions 1121 to 1124. The mover 1130 may be positioned in the accommodating part 1125.

The mover 1130 may include the holder 1131 and the optical member 1132 seated on the holder 1131.

The holder 1131 may be seated in the accommodating part 1125 of the first housing 1120. The holder 1131 may include a first prism outer surface to a fourth prism outer surface respectively corresponding to the first housing side portion 1121, the second housing side portion 1122, the third housing side portion 1123, and the fourth housing side portion 1124.

A seating groove in which the second magnetic part 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto. In addition, the optical member 1132 may reflect light reflected from the outside (e.g., an object) into the camera device. In other words, the optical member 1132 can resolve spatial limits of the first camera actuator and the second camera actuator by changing the path of the reflected light. Therefore, it should be understood that the camera device may provide a high range of magnification by extending the optical path while a thickness thereof is minimized.

The rotating unit 1140 includes the rotating plate 1141, the first magnetic part 1142 having the coupling strength with the rotating plate 1141, and the second magnetic part 1143 positioned in the rotating plate 1141.

The rotating plate 1141 may be coupled to the mover 1130 and the first housing 1120. The rotating plate 1141 may include an additional magnetic part (not illustrated) positioned therein.

In addition, the rotating plate 1141 may be disposed adjacent to the optical axis. Therefore, the actuator according to the embodiment may easily change the optical path according to first-axis tilting and second-axis tilting to be described below.

The rotating plate 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. Detailed description thereof will be made below.

In addition, the first magnetic part 1142 includes a plurality of yokes, and the plurality of yokes may be positioned to face each other based on the rotating plate 1141. In the embodiment, the first magnetic part 1142 may include a plurality of facing yokes. In addition, the rotating plate 1141 may be positioned between the plurality of yokes.

As described above, the first magnetic part 1142 may be positioned in the first housing 1120. In addition, as described above, the first magnetic part 1142 may be seated on the inner surface or outer surface of the fourth housing side portion 1124. For example, the first magnetic part 1142 may be seated in a groove formed in the outer surface of the fourth housing side portion 1124. Alternatively, the first magnetic part 1142 may be seated in the first housing groove 1124a.

In addition, the second magnetic part 1143 may be positioned on the mover 1130, particularly, an outer surface of the holder 1131. With this configuration, the rotating plate 1141 may be easily coupled to the first housing 1120 and the mover 1130 by the coupling strength generated by a magnetic force between the second magnetic part 1143 and the first magnetic part 1142 disposed therein. In the present invention, the positions of the first magnetic part 1142 and the second magnetic part 1143 may be interchanged.

The first driving unit 1150 includes the first driving magnet 1151, the first driving coil 1152, the first Hall sensor unit 1153, and the first board unit 1154.

The first driving magnet 1151 may include a plurality of magnets. In the embodiment, the first driving magnet 1151 may include a first magnet 1151a, a second magnet 1151b, and a third magnet 1151c.

The first magnet 1151a, the second magnet 1151b, and the third magnet 1151c may each be positioned on the outer surface of the holder 1131. In addition, the first magnet 1151a and the second magnet 1151b may be positioned to face each other. In addition, the third magnet 1151c may be positioned on a lower surface of the outer surface of the holder 1131. Detailed description thereof will be made below.

The first driving coil 1152 may include a plurality of coils. In the embodiment, the first driving coil 1152 may include a first coil 1152a, a second coil 1152b, and a third coil 1152c.

The first coil 1152a may be positioned to face the first magnet 1151a. Therefore, as described above, the first coil 1152a may be positioned in the first housing hole 1121a of the first housing side portion 1121.

In addition, the second coil 1152b may be positioned to face the second magnet 1151b. Therefore, as described above, the second coil 1152b may be positioned in the second housing hole 1122a of the second housing side portion 1122.

The first coil 1152a may be positioned to face the second coil 1152b. In other words, the first coil 1152a may be symmetrically disposed with the second coil 1152b with respect to the first direction (X-axis direction). This may also be applied to the first magnet 1151a and the second magnet 1151b in the same manner. In other words, the first magnet 1151a and the second magnet 1151b may be symmetrically disposed with respect to the first direction (X-axis direction). In addition, at least parts of the first coil 1152a, the second coil 1152b, the first magnet 1151a, and the second magnet 1151b may be disposed to overlap in the second direction (Y-axis direction). With this configuration, the X-axis tilting may be accurately performed without being biased to one side by the electromagnetic force between the first coil 1152a and the first magnet 1151a and the electromagnetic force between the second coil 1152b and the second magnet 1151b.

The third coil 1152c may be positioned to face the third magnet 1151c. Therefore, as described above, the third coil 1152c may be positioned in the third housing hole 1123a of the third housing side portion 1123. The third coil 1152c may generate an electromagnetic force with the third magnet 1151c so that the mover 1130 and the rotating unit 1140 may perform a Y-axis tilting based on the first housing 1120.

Here, an X-axis tilting is a tilting with respect to the X-axis, and a Y-axis tilting is a tilting with respect to the Y-axis.

The first Hall sensor unit 1153 may include a plurality of Hall sensors. The Hall sensor corresponds to and is used interchangeably with "sensor unit" to be described below. In the embodiment, the first Hall sensor unit 1153 may include a first Hall sensor 1153a, a second Hall sensor 1153b, and a third Hall sensor 1153c.

The first Hall sensor 1153a may be positioned inside the first coil 1152a. In addition, the second Hall sensor 1153b may be disposed symmetrically with the first Hall sensor 1153a in the first direction (X-axis direction) and the third direction (Z-axis direction). In addition, the second Hall sensor 1153b may be positioned inside the second coil 1152b.

The first Hall sensor 1153a may detect a change in a magnetic flux inside the first coil 1152a. In addition, the second Hall sensor 1153b may detect a change in a magnetic flux in the second coil 1152b. Therefore, it is possible to perform position sensing between the first and second magnets 1151a and 1151b and the first and second Hall sensors 1153a and 1153b. The first camera actuator according to the embodiment may more accurately control the X-axis tilting by detecting the position through, for example, the first and second Hall sensors 1153a and 1153b.

In addition, the third Hall sensor 1153c may be positioned inside the third coil 1152c. The third Hall sensor 1153c may detect a change in a magnetic flux inside the third coil 1152c. Therefore, it is possible to perform position sensing between the third magnet 1151c and the third Hall sensor 1153c. Therefore, the first camera actuator according to the embodiment may control the Y-axis tilting. At least one of the first to third Hall sensors may be provided.

The first board unit 1154 may be positioned under the first driving unit 1150. The first board unit 1154 may be electrically connected to the first driving coil 1152 and the first Hall sensor unit 1153. For example, the first board unit 1154 may be coupled to the first driving coil 1152 and the first Hall sensor unit 1153 by a surface mount technology (SMT). However, the present invention is not limited to this method.

The first board unit 1154 may be positioned between the first shield can (not illustrated) and the first housing 1120 and coupled to the first shield can and the first housing 1120. The coupling method may be variously performed as described above. In addition, through the coupling, the first driving coil 1152 and the first Hall sensor unit 1153 may be positioned on an outer surface of the first housing 1120.

The first board unit 1154 may include a circuit board having wiring patterns that may be electrically connected, such as a rigid printed circuit board (rigid PCB), a flexible PCB, and a rigid-flexible PCB. However, the present invention is not limited to these types.

Figure 5:
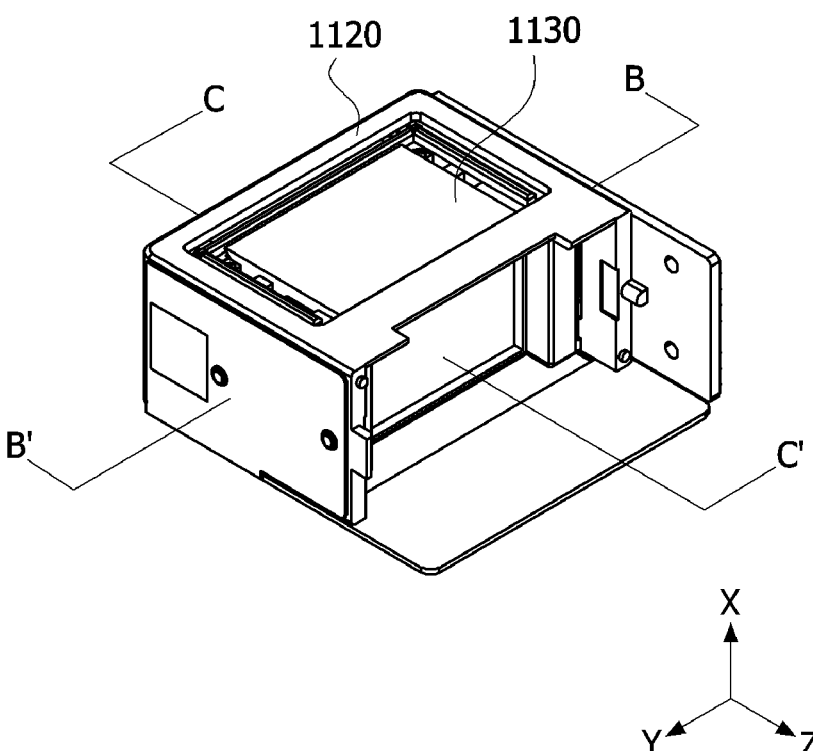
FIG. 5 is a perspective view of the first camera actuator according to the embodiment from which a first shield can and a board are removed.
Figure 6:
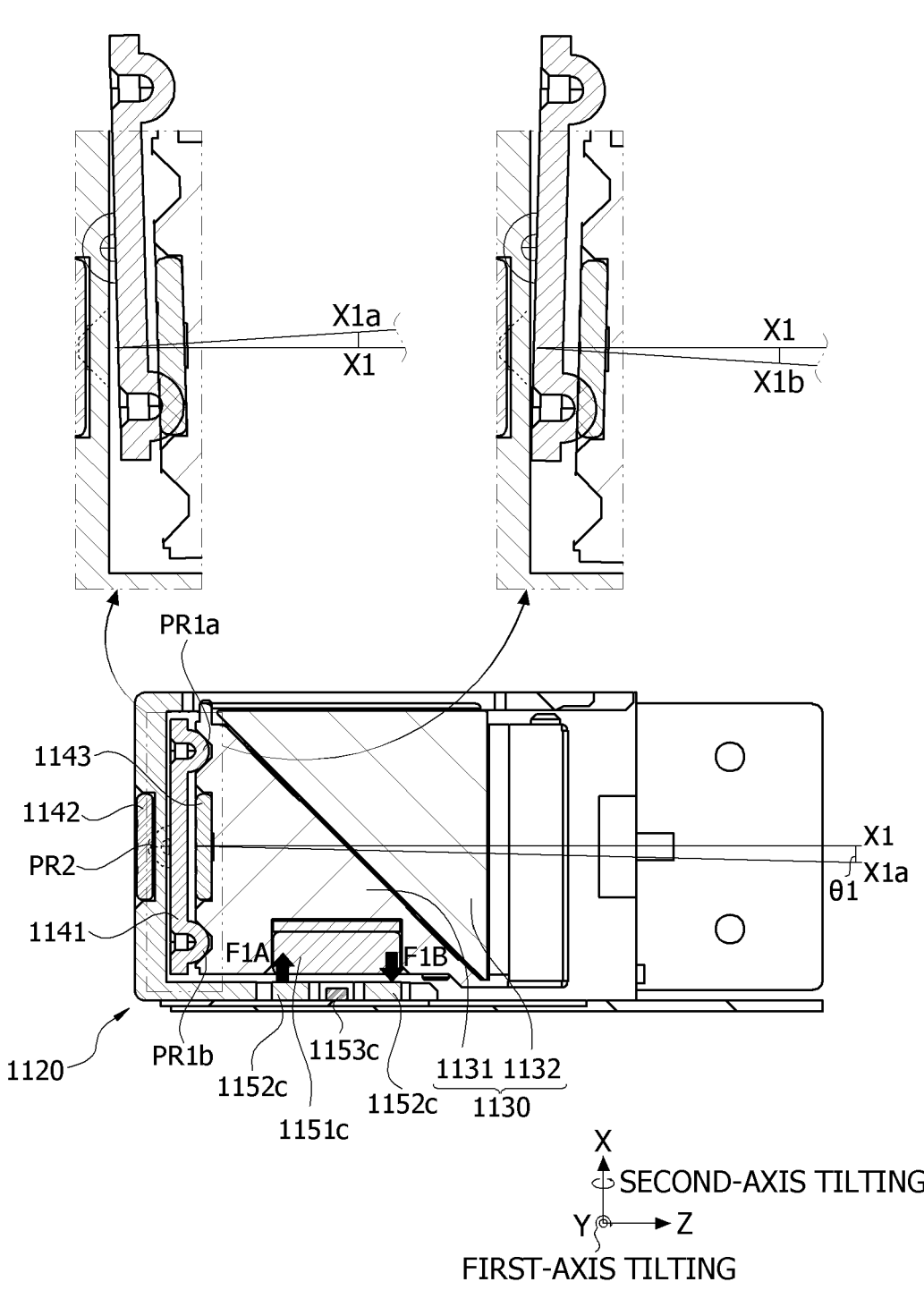
FIG. 6 is a cross-sectional view along line B-B' in FIG. 5.
Figure 7:
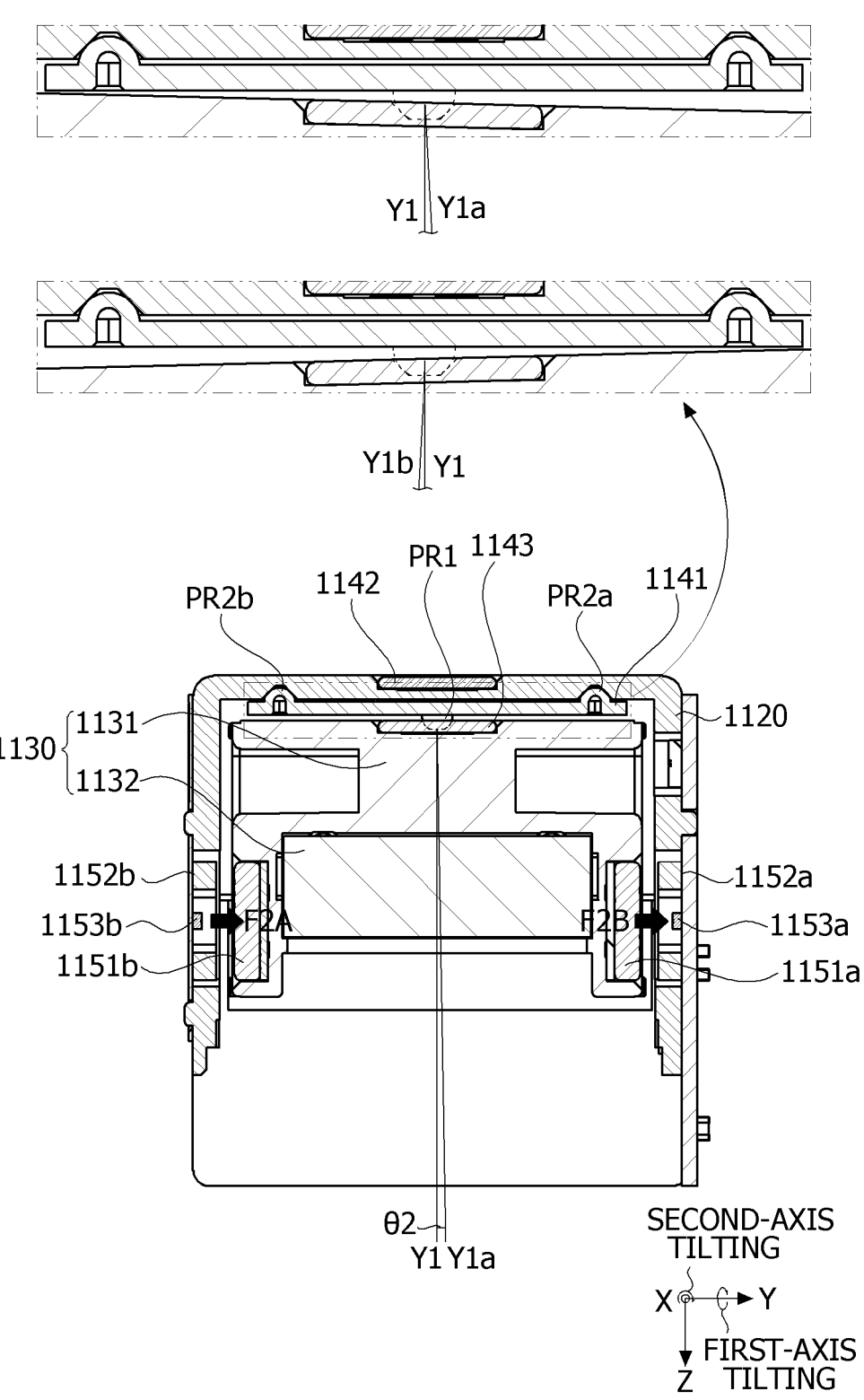
FIG. 7 is a cross-sectional view along line C-C' in FIG. 5.

FIG. 5 is a perspective view of the first camera actuator according to the embodiment from which a first shield can and a board are removed, FIG. 6 is a cross-sectional view along line B-B' in FIG. 5, and FIG. 7 is a cross-sectional view along line C-C' in FIG. 5.

Referring to FIGS. 5 to 7, the first coil 1152a may be positioned on the first housing side portion 1121.

In addition, the first coil 1152a and the first magnet 1151a may be positioned to face each other. At least a portion of the first magnet 1151a may overlap the first coil 1152a in the second direction (Y-axis direction).

In addition, the second coil 1152b may be positioned on the second housing side portion 1122. Therefore, the second coil 1152b and the second magnet 1151b may be positioned to face each other. At least a portion of the second magnet 1151b may overlap the second coil 1152b in the second direction (Y-axis direction).

In addition, the first coil 1152*a* and the second coil 1152*b* may overlap each other in the second direction (Y-axis direction). In addition, the first magnet 1151*a* and the second magnet 1151*b* may overlap each other in the second direction (Y-axis direction). With this configuration, the electromagnetic force applied to the outer surfaces of the holder (the first holder outer surface and the second holder outer surface) may be positioned on parallel axes in the second direction (Y-axis direction) so that the X-axis tilting may be performed accurately and precisely.

In addition, a first accommodating groove (not illustrated) may be positioned at the fourth holder outer surface. In addition, first protrusions PR1*a* and PR1*b* may be disposed in the first accommodating groove. Therefore, when the X-axis tilting is performed, the first protrusions PR1*a* and PR1*b* may serve as reference axes (or rotation axes) of the tilting. Therefore, the rotating plate 1141 and the mover 1130 may move to a left or right side.

As described above, the second protruding portion PR2 may be seated in a groove of an inner surface of the fourth housing side portion 1124. In addition, when the Y-axis tilting is performed, the rotating plate and the mover may be rotated using the second protruding portion PR2 as a reference axis of the Y-axis tilting.

According to the embodiment, an OIS may be performed by the first protruding portion and the second protruding portion.

Referring to FIG. 6, the Y-axis tilting may be performed. In other words, an OIS can be implemented by rotating the first camera actuator in the first direction (X-axis direction).

In the embodiment, the third magnet 1151*c* disposed under the holder 1131 may generate the electromagnetic force with the third coil 1152*c* to tilt or rotate the mover 1130 in the first direction (X-axis direction).

Specifically, the rotating plate 1141 may be coupled to the first housing 1120 and the mover 1130 by the first magnetic part 1142 in the first housing 1120 and the second magnetic part 1143 in the mover 1130. In addition, the first protruding portions PR1 may be spaced apart from each other in the first direction (X-axis direction) and supported by the first housing 1120.

In addition, the rotating plate 1141 may be rotated or tilted using the second protruding portion PR2 protruding toward the mover 1130 as a reference axis (or a rotation axis). In other words, the rotating plate 1141 may perform the Y-axis tilting using the second protruding portion PR2 as the reference axis.

For example, an OIS can be implemented by rotating (X1→X1*a* or X1*b*) the mover 130 at a first angle θ1 in the X-axis direction by first electromagnetic forces F1A and F1B between the third magnet 1151*c* disposed in a third seating groove and the third coil 1152*c* disposed on a third board side portion. The first angle θ1 may be in a range of ±1° to ±3°. However, the present invention is not limited thereto.

Referring to FIG. 7, the X-axis tilting may be performed. In other words, an OIS can be implemented by rotating the mover 1130 in the second direction (Y-axis direction).

The OIS can be implemented by tilting or rotating (or X-axis tilting) the mover 1130 in the Y-axis direction.

In the embodiment, the first magnet 1151*a* and the second magnet 1151*b* disposed in the holder 1131 may tilt or rotate the rotating plate 1141 and the mover 1130 in the second direction (Y-axis direction) by generating the electromagnetic force with the first coil 1152*a* and the second coil 1152*b*, respectively.

The rotating plate 1141 may be rotated or tilted (X-axis tilting) in the second direction using the first protruding portion PR1 as a reference axis (or a rotation axis).

For example, an OIS can be implemented by rotating (Y1→Y1*a*, Y1*b*) the mover 130 at a second angle θ2 in the Y-axis direction by second electromagnetic forces F2A and F2B between the first and second magnets 1151*a* and 1151*b* disposed in a first seating groove and the first and second coils 1152*a* and 1152*b* disposed on first and second board side portions. The second angle θ2 may be in a range of ±1° to ±3°. However, the present invention is not limited thereto.

However, the second electromagnetic forces F2A and F2B may be a direction of an electromagnetic force considering the movement of the mover 1130. For example, the electromagnetic force may move in the third direction (Z-axis direction). In addition, an electromagnetic force may act on the first coil 1152*a* in the third direction, and an electromagnetic force may act on the second coil 1152*b* in a direction opposite to the third direction. At this time, the first magnet 1151*a* and the second magnet 1151*b* may be moved in the illustrated directions F2B and F2A by receiving a force generated by the electromagnetic force.

As described above, the first camera actuator according to the embodiment may control the rotating plate 1141 and the mover 1130 to be rotated in the first direction (X-axis direction) or the second direction (Y-axis direction) by the electromagnetic force between the first driving magnet in the holder and the first driving coil disposed in the housing, thereby minimizing the occurrence of a decentering or tilting phenomenon and providing the best optical characteristics upon implementing the OIS. In addition, as described above, "Y-axis tilting" may correspond to rotating or tilting in the first direction (X-axis direction). In addition, "X-axis tilting" may correspond to rotating or tilting in the second direction (Y-axis direction).

Figure 8:
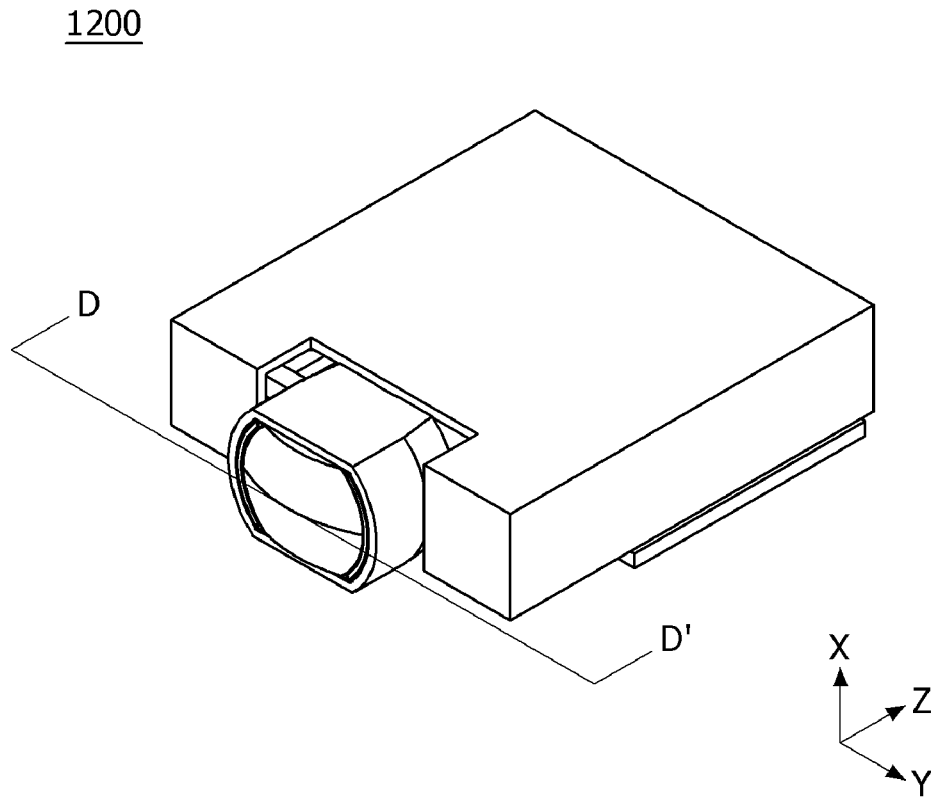
FIG. 8 is a perspective view of a second camera actuator according to a first embodiment.
Figure 9:
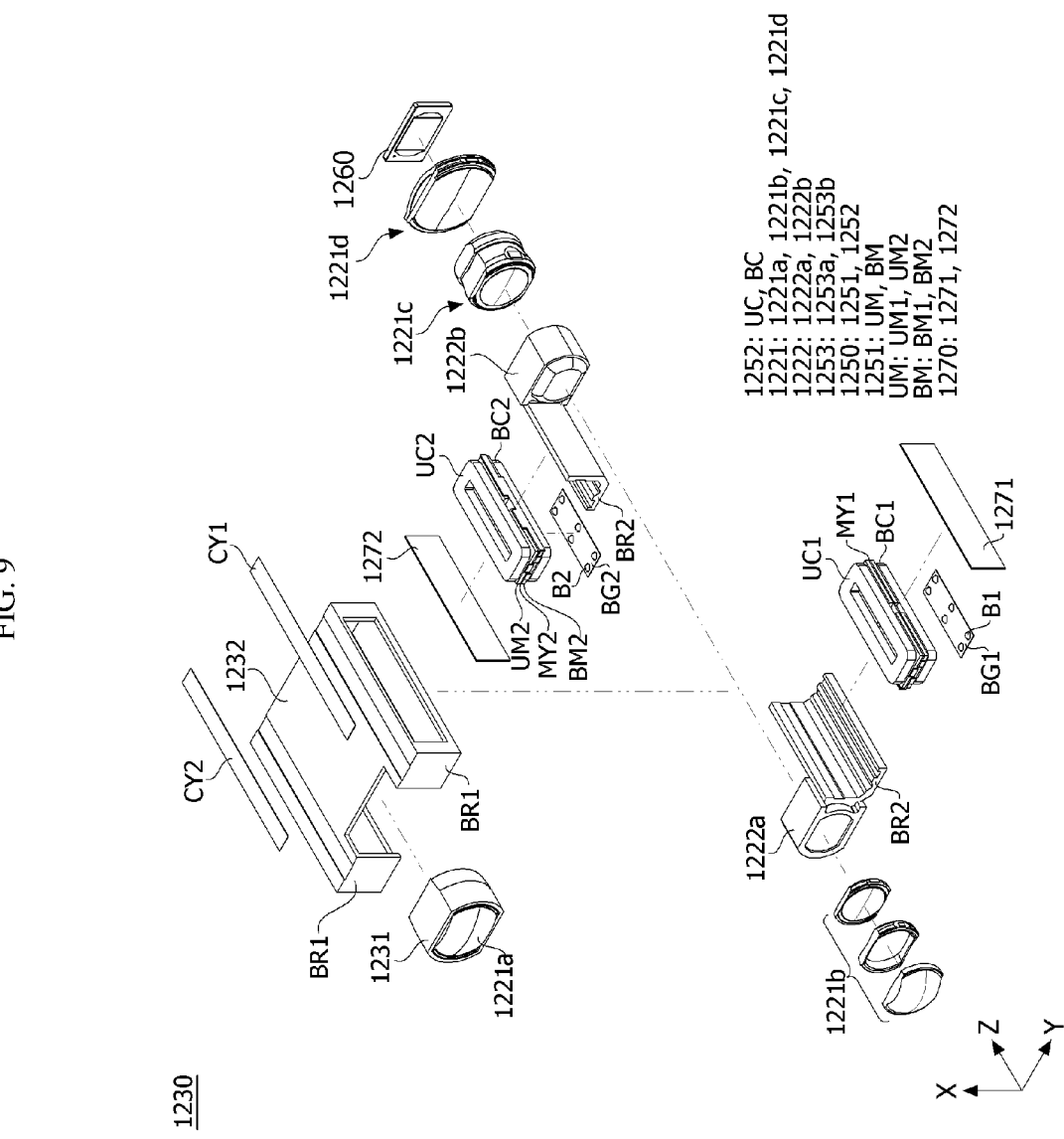
FIG. 9 is an exploded perspective view of the second camera actuator according to the first embodiment.
Figure 10:
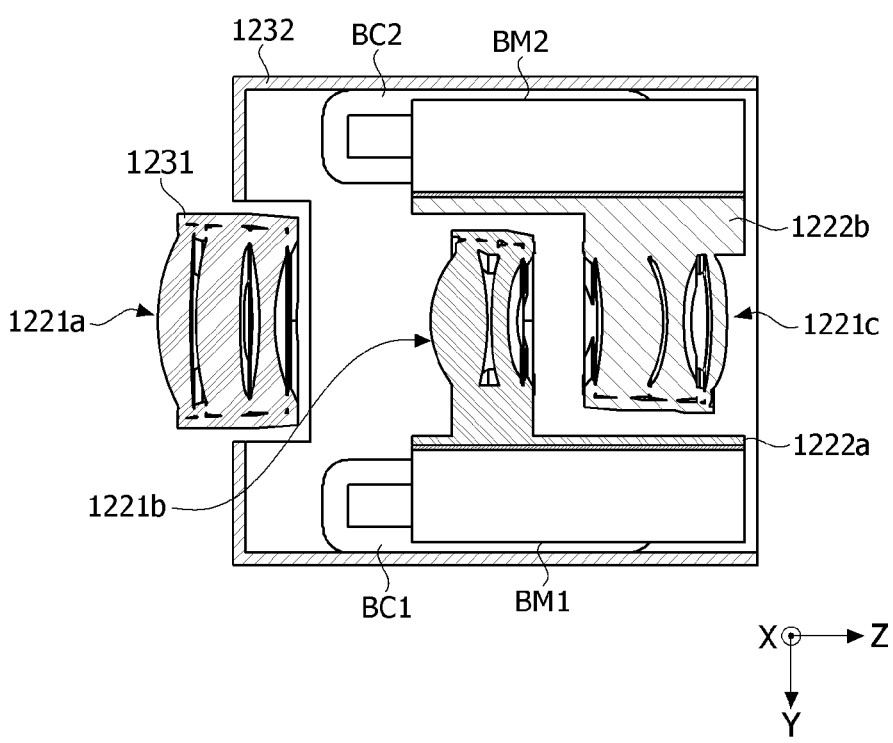
FIG. 10 is a cross-sectional view along line D-D' in FIG. 8.

FIG. 8 is a perspective view of a second camera actuator according to a first embodiment, FIG. 9 is an exploded perspective view of the second camera actuator according to the first embodiment, and FIG. 10 is a cross-sectional view along line D-D' in FIG. 8.

Referring to FIGS. 8 to 10, the second camera actuator 1200 according to the embodiment may include a lens unit 1220, a second housing 1230, a second driving unit 1250, a base unit 1260, a second board unit 1270, magnet yokes MY1 and MY2, coil yokes CY1 and CY2, and ball units B1 and B2. Furthermore, the second camera actuator 1200 may include a second shield can (not illustrated), an elastic unit (not illustrated), and a bonding member (not illustrated). In addition, the second camera actuator 1200 may include a ball guide unit BG1 and BG2.

First, the second shield can (not illustrated) may be positioned in one area (e.g., an outermost side) of the second camera actuator 1200 and positioned to surround the components (the lens unit 1220, the second housing 1230, the second driving unit 1250, the base unit 1260, the second board unit 1270, and an image sensor IS) to be describe below.

The second shield can (not illustrated) can block or reduce electromagnetic waves generated from the outside. Therefore, it is possible to reduce the occurrence of malfunction in the second driving unit 1250.

The lens unit 1220 may be positioned in the second shield can (not illustrated). The lens unit 1220 may include a plurality of lenses. At least one of the plurality of lenses may move in the third direction (Z-axis direction or optical axis direction). Therefore, the above-described AF function and zooming function can be performed.

In addition, the lens unit 1220 may be positioned in the second housing 1230. Therefore, at least a portion of the lens unit 1220 may move in the second housing 1230 in the optical axis direction or the third direction (Z-axis direction).

Specifically, the lens unit 1220 may include a lens group 1221 and a moving assembly 1222.

First, the lens group 1221 may include at least one lens. A plurality of lens groups 1221 may be provided. In addition, a plurality of moving assemblies 1222 may be provided. Each lens group may be positioned in each moving assembly.

In addition, the lens group 1221 may be coupled to the moving assembly 1222 and may be moved in the third direction (Z-axis direction) by the electromagnetic force generated by the second driving magnet coupled to the moving assembly 1222.

In the embodiment, the lens group 1221 may include a first lens group 1221a, a second lens group 1221b, and a third lens group 1221c. The first lens group 1221a, the second lens group 1221b, and the third lens group 1221c may be sequentially disposed in the optical axis direction. Furthermore, the lens group 1221 may further include a fourth lens group (not illustrated). The fourth lens group (not illustrated) may be disposed at a rear end of the third lens group 1221c. Furthermore, the lens group 1221 may further include an additional lens group other than the fourth lens group (not illustrated).

The first lens group 1221a may be fixedly coupled to a 2-1 housing 2131. In other words, the first lens group 1221a may not move in the optical axis direction.

The second lens group 1221b may be coupled to a first lens assembly 1222a to move in the third direction or the optical axis direction. Magnification adjustment (zooming) or auto focusing may be performed by moving the first lens assembly 1222a and the second lens group 1221b.

The third lens group 1221c may be coupled to the second lens assembly 1222b to move in the third direction or the optical axis direction. Focus adjustment/auto focusing or magnification adjustment (zooming) may be performed by moving the third lens group 1221c.

However, the present invention is not limited to the number of lens groups, and the fourth lens group 1221d may not be present, or additional lens groups or the like other than the fourth lens group 1121d may be further disposed.

The moving assembly 1222 may include an opening area surrounding the lens group 1221. The moving assembly 1222 is used interchangeably with the lens assembly in the specification. In addition, the moving assembly 1222 may be coupled to the lens group 1221 by various methods. In addition, the moving assembly 1222 may include a groove in a side surface thereof and may be coupled to the second driving magnet 1251 through the groove. A coupling member or the like may be applied to the groove.

In addition, the moving assembly 1222 may be coupled to the elastic units (not illustrated) at a front end and a rear end thereof. Therefore, the moving assembly 1222 may be supported by the elastic units (not illustrated) while moving in the third direction (Z-axis direction). In other words, the position of the moving assembly 1222 may be maintained in the third direction (Z-axis direction). The elastic unit (not illustrated) may be formed of various elastic elements such as a leaf spring.

The moving assembly 1222 may be positioned in the second housing 1230 and may include the first lens assembly 1222a and a second lens assembly 1222b.

An area of the second lens assembly 1222b in which the third lens group is seated may be positioned at a rear end of the first lens assembly 1222a. In other words, the area of the second lens assembly 1222b in which the third lens group 1221c is seated may be positioned between an area of the first lens assembly 1222a in which the second lens group 1221b is seated and the image sensor.

In addition, the first lens assembly 1222a may be positioned at a front end of the second lens assembly 1222b. In addition, the second lens assembly 1222b may be positioned at a front end of the image sensor. Therefore, the first lens assembly 1222a, the second lens assembly 1222b, and the image sensor may be disposed sequentially with respect to the optical axis direction or the third direction (Z-axis direction).

An assembly guide unit protruding outward and extending in the optical axis direction or the third direction (Z-axis direction) may be positioned in the first lens assembly 1222a and the second lens assembly 1222b. A length of the assembly guide unit 1222aw (see FIG. 15) in the third direction may be larger than a length of the second lens group 1221b or the third lens group 1221c in the third direction (Z-axis direction).

Furthermore, the first lens assembly 1222a and the second lens assembly 1222b may include a second ball recess BR2 in which the ball units B1 and B2 are seated. The ball units B1 and B2 may include the first ball B1 for moving the first lens assembly 1222a and the second ball B2 for moving the second lens assembly 1222b. The ball units B1 and B2 may be positioned between the first lens assembly 1222a and the second housing 1232 and between the second lens assembly 1222b and the second housing 1232.

The first ball B1 may come into contact with the first lens assembly 1222a. The second ball B2 may come into contact with the second lens assembly 1222b.

For example, the first ball B1 may be seated in the second ball recess BR2 of the first lens assembly 1222a. The second ball B2 may be seated in the second ball recess BR2 of the second lens assembly 1222b. Therefore, the first ball B1 or the second ball B2 may be seated in the second ball recess BR2 and a first ball recess BR1 of the second housing and may move in the third direction (Z-axis direction). Therefore, the first ball B1 may move in the third direction (Z-axis direction) along the first ball recess BR1 and the second ball recess BR2. Therefore, the first lens assembly 1222a may also move in the third direction (Z-axis direction). In addition, the second ball B2 may move in the third direction (Z-axis direction) along the first ball recess BR1 and the second ball recess BR2. Therefore, the second lens assembly 1222b may also move in the third direction (Z-axis direction). The first ball recess BR1 and the second ball recess BR2 may have a multi-point contact structure. For example, the first ball recess BR1 and the second ball recess BR2 may have a three-point contact or four-point contact structure. Furthermore, the first ball recess BR1 and the second ball recess BR2 may have a multi-point contact structure having the same or different numbers of points.

In addition the ball units B1 and B2 may pass through the ball guide unit BG1 and BG2. Detailed description thereof will be made below.

In addition, the second driving magnet 1251 may be seated on the magnet yokes MY1 and MY2 coupled to the first lens assembly 1222a and the second lens assembly 1222b. For example, a second upper magnet UM2 and a second bottom magnet BM2 may be seated on the second lens assembly 1222b through the second magnet yoke MY2.

In addition, a first upper magnet UM1 and a first bottom magnet BM1 may be seated in the first lens assembly 1222a through the first magnet yoke MY1.

The second housing 1230 may be disposed between the lens unit 1220 and the second shield can (not illustrated). In addition, the second housing 1230 may be disposed to surround the lens unit 1220.

The second housing 1230 may include the 2-1 housing 1231 (or the first housing member) and the 2-2 housing 1232 (or the second housing member). The 2-1 housing 1231 may be coupled to the first lens group 1221a and may also be coupled to the above-described first camera actuator. The 2-1 housing 1231 may be positioned in front of the 2-2 housing 1232.

In addition, the 2-2 housing 1232 may be positioned at a rear end of the 2-1 housing 1231. The lens unit 1220 may be seated inside the 2-2 housing 1232. Hereinafter, the 2-2 housing 1232 will be used interchangeably with "second housing 1232."

A hole may be formed in a side portion of the second housing 1230 (or the 2-2 housing 1232). A first board 1271 or a second board 1272 may be disposed adjacent to the hole. The hole may be positioned to correspond to the above-described groove of the moving assembly 1222.

In an embodiment, the second housing 1230 (particularly, the 2-2 housing 1232) may include a first side portion and a second side portion. The first side portion and the second side portion may be positioned correspondingly. For example, the first side portion and the second side portion may be arranged symmetrically with respect to the third direction.

In addition, the second board unit 1270 may be seated on outer surfaces of the first side portion and the second side portion. In other words, the first board 1271 may be positioned on the outer surface of the first side portion, and the second board 1272 may be positioned on the outer surface of the second side portion.

According to the embodiment, the first ball B1 may be disposed on or under the first lens assembly 1222a or the second lens assembly 1222b. In addition, the second ball B2 may be disposed on above or under the first lens assembly 1222a or the second lens assembly 1222b. For example, the first ball B1 may be positioned to overlap the second ball B2 in a plane (YZ). For example, the first ball B1 and the second ball B2 may have the same distance from a center (optical axis) of the lens group in the first direction (X-axis direction). Therefore, at least a portion of the first ball B1 may overlap the second ball B2 in the second direction (Y-axis direction) depending on a position.

The second driving coil 1252 may face the second driving magnet 1251.

The second driving coil 1252 may include an upper coil UC disposed on the second driving magnet 1251 and a bottom coil BC disposed under the second driving magnet 1251. In addition, the second driving magnet 1251 may include an upper magnet UM and a bottom magnet BM. In the specification, the upper magnet UM may be "first magnet," "first magnet in the second camera actuator," or "upper magnet in the second camera actuator." In addition, the bottom magnet BM may be "second magnet," "second magnet in the second camera actuator," or "bottom magnet in the second camera actuator."

The upper coil UC may face the upper magnet UM. In other words, a lower surface of the upper coil UC and an upper surface of the upper magnet UM may face each other. At least portions of the lower surface of the upper coil UC and the upper surface of the upper magnet UM may overlap each other in the first direction (X-axis direction).

In addition, the bottom coil BC may face the bottom magnet BM. In other words, the upper surface of the bottom coil BC and the lower surface of the bottom magnet BM may face each other. At least portions of the lower surface of the bottom coil BC and the upper surface of the upper magnet UM may overlap each other in the first direction (X-axis direction).

In the specification, the upper coil UC may be "first coil," "first coil in the second camera actuator," or "upper coil in the second camera actuator." In addition, the bottom coil BC may be "second coil," "second coil in the second camera actuator," or "bottom coil in the second camera actuator."

The second driving coil 1252 may be coupled to the second housing 1232. The second housing 1232 is a fixed part of the second camera actuator 1200, and the second driving coil 1252 may not move by being coupled to the second housing 1232, which is the fixed part.

In addition, the second camera actuator 1200 according to the embodiment may have the upper coil UC and the bottom coil BC to implement a long stroke within a length limit of the second camera actuator 1200 in the third direction (Z-axis direction).

In addition, the elastic unit (not illustrated) may include a first elastic member (not illustrated) and a second elastic member (not illustrated). The first elastic member (not illustrated) may be coupled to an upper surface of the moving assembly 1222. The second elastic member (not illustrated) may be coupled to a lower surface of the moving assembly 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the moving assembly 1222. However, the present invention is not limited to the above-described position, and the elastic unit may be disposed at any of various positions.

In addition, the second driving unit 1250 may provide a driving force for moving the lens unit 1220 in the third direction (Z-axis direction). The second driving unit 1250 may include the second driving coil 1252 and the second driving magnet 1251. Furthermore, the second driving unit 1250 may further include a second Hall sensor unit. The second Hall sensor unit (not illustrated) may include at least one Hall sensor. For example, the second Hall sensor unit may detect the movement of the first lens assembly 1222a. In addition, the second Hall sensor unit may detect the movement of the second lens assembly 1222b.

In addition, the moving assembly may be moved in the third direction (Z-axis direction) by the electromagnetic force generated between the second driving coil 1252 and the second driving magnet 1251 with respect to the second housing 1232.

The second driving coil 1252 may be electrically connected to the second board unit 1270. Therefore, for example, the second driving coil 1252 may receive a current or the like through the second board unit 1270.

In addition, the second driving coil 1252 may be coupled to the second housing 1232 through the coil yokes CY1 and CY2 positioned in the second housing 1232. Furthermore, in an embodiment, the second driving coil 1252 is a fixed element together with the second board unit 1270. In contrast, the second driving magnet 1251 is a moving element that moves in the optical axis direction (Z-axis direction) together with the first and second assemblies. Furthermore, the coil yokes CY1 and CY2 may also generate an attractive force with the second driving magnet 1251 to maintain coupling between the second housing 1232 and the first and second lens assemblies 1222*a* and 1222*b*. Furthermore, a predetermined force may also be applied to the ball units B1 and B2 between the second housing 1232 and the first and second lens assemblies 1222*a* and 1222*b*. In other words, a predetermined friction force may be present in the ball units B1 and B2. The coil yokes CY1 and CY2 may be yokes for generating a coupling strength with the coil.

The second driving magnet 1251 may be coupled to the first and second lens assemblies (or the moving assemblies) together with the magnet yokes MY1 and MY2.

The base unit 1260 may be positioned between the lens unit 1220 and the image sensor IS. A component such as a filter may be fixed to the base unit 1260. In addition, the base unit 1260 may be disposed to surround the above-described image sensor. With this configuration, since the image sensor is free from foreign substances and the like, it is possible to improve the reliability of the device. However, the following description will be made without this in some drawings.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

In addition, the second camera actuator may be a fixed zoom or a continuous zoom. For example, the second camera actuator may provide a movement of the lens group 1221.

In addition, the second camera actuator may be formed of a plurality of lens assemblies. For example, in addition to the first lens assembly 1222*a* and the second lens assembly 1222*b*, at least one of a third lens assembly (not illustrated) and the guide pin (not illustrated) may be disposed in the second camera actuator. The guide pin (not illustrated) can constantly maintain the optical axis between the lens groups or suppress tilting of the lens.

In addition, the second camera actuator may perform a high-magnification zooming function through the second driving unit. For example, the first lens assembly 1222*a* and the second lens assembly 1222*b* may be moving lenses that move through the second driving unit and the guide pin (not illustrated), and the third lens assembly (not illustrated) may be a fixed lens, but the present invention is not limited thereto. For example, the third lens assembly (not illustrated) may perform a function of a focator by which light forms an image at a specific position, and the first lens assembly may perform a function of a variator for re-forming an image formed by the third lens assembly (not illustrated), which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the second lens assembly 1222*b* which is the variator.

However, the configuration of the embodiment will be described with reference to the following drawings.

The image sensor may be positioned at the inner side or the outer side of the second camera actuator. In an embodiment, as illustrated, the image sensor may be positioned at the outer side of the second camera actuator. For example, the image sensor may be positioned on a circuit board. The image sensor may receive light and convert the received light into an electrical signal. In addition, the image sensor may include a plurality of pixels in the form of an array. In addition, the image sensor may be positioned on the optical axis.

The second board unit 1270 may be in contact with the second housing side portion. For example, the second board unit 1270 may be positioned on an outer surface (first side surface) of the first side portion and an outer surface (second side surface) of the second side portion of the second housing, in particular, the 2-2 housing and may be in contact with the first side surface and the second side surface.

Figure 11:
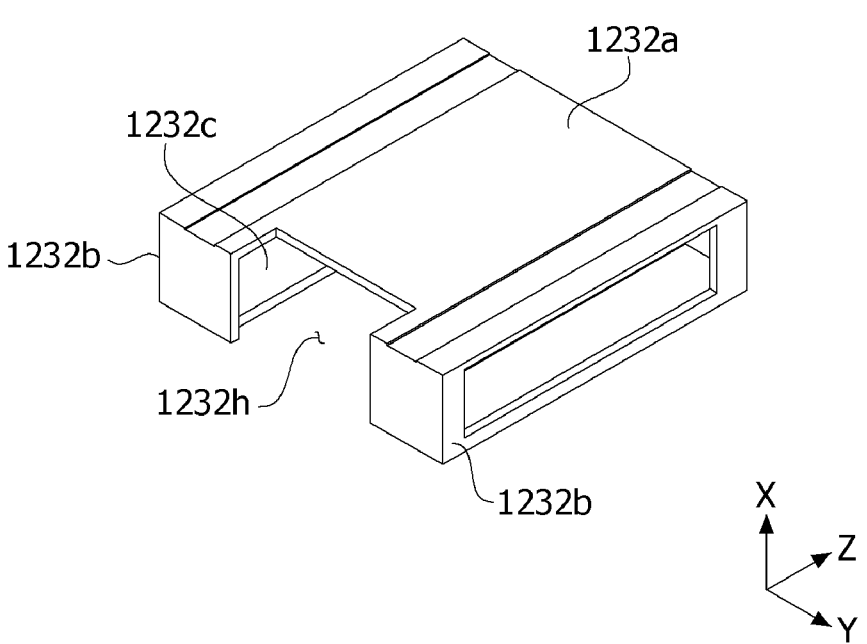
FIG. 11 is a perspective view of a second housing of the second camera actuator according to the embodiment.
Figure 12:
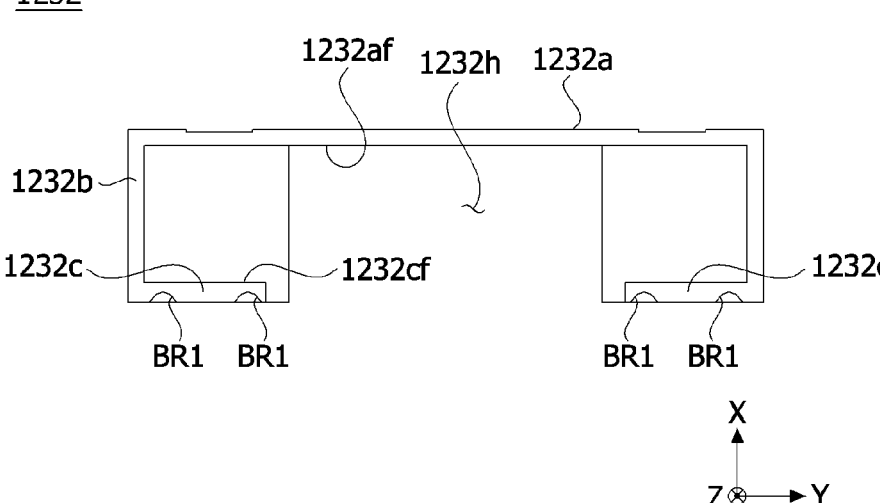
FIG. 12 is a rear view of the second housing of the second camera actuator according to the embodiment.
Figure 13:
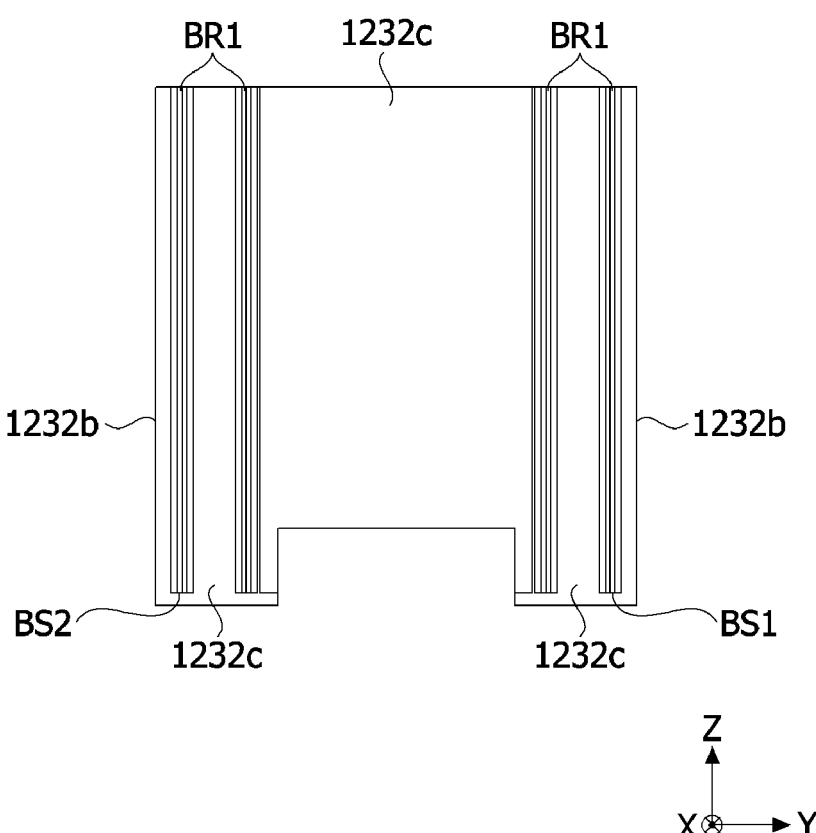
FIG. 13 is a bottom view of the second housing of the second camera actuator according to the embodiment.

FIG. 11 is a perspective view of a second housing of the second camera actuator according to the embodiment, FIG. 12 is a rear view of the second housing of the second camera actuator according to the embodiment, and FIG. 13 is a bottom view of the second housing of the second camera actuator according to the embodiment.

Referring to FIGS. 11 to 13, the second housing 1232 according to the embodiment may include a base 1232*a*, a first extension portion 1232*b*, and a second extension portion 1232*c*.

Furthermore, the second housing 1232 may include an opening 1232*h* in the third direction (Z-axis direction). Therefore, light reflected from the first camera actuator may pass through the lenses of the first lens assembly and the second lens assembly in the second housing 1232 and move to the image sensor at the rear end of the lens assemblies.

The base 1232*a* may be positioned above or under. For example, the base 1232*a* may be positioned above the first lens assembly and the second lens assembly. Therefore, the first lens assembly and the second lens assembly may overlap the base 1232*a* in the first direction (X-axis direction).

The first extension portion 1232*b* may extend in a direction perpendicular to the base 1232*a* or in the first direction (X-axis direction). For example, the first extension portion 1232*b* may extend downward or in the first direction (X-axis direction) from both end portions of the base 1232*a* in the second direction (Y-axis direction).

For example, an upper surface of the base 1232*a* may be an upper surface of the second housing 1232. In addition, an outer surface of the first extension portion 1232*b* may be an outer surface of the second housing 1232.

In addition, the second extension portion 1232*c* may extend inward from a lower end portion of the first extension portion 1232*b*. For example, the second extension portion 1232*c* may extend toward the second and third lens groups. Alternatively, the second extension portion 1232*c* may extend toward the optical axis.

In an embodiment, the second extension portion 1232*c* may overlap the base 1232*a* in the first direction (X-axis direction) or the vertical direction. For example, a length of the second extension portion 1232*c* in the second direction (Y-axis direction) may be smaller than a length of the base 1232*a* in the second direction (Y-axis direction).

In addition, the second extension portion 1232*c* may extend downward in contact with both end portions of the base 1232*a* in the second direction (Y-axis direction). Therefore, two second extension portions 1232*c* may be provided.

In addition, since the second extension portion 1232c extends inward in contact with end portions of each of the two first extension portions 1232b, two second extension portions 1232c may also be provided.

The above-described second driving coil may be disposed between the base 1232a and the second extension portion 1232c. Furthermore, the second driving coil may be disposed inside the base 1232a and the second extension portion 1232c.

In addition, the upper coil of the second driving coil may be seated on a lower surface 1232af of the base 1232a. In addition, the bottom coil of the second driving coil may be seated on an upper surface 1232cf of the second extension portion 1232c.

In addition, the second extension portion 1232c may include the first ball recess BR1 positioned on the lower surface thereof. For example, like the second extension portion 1232c, the first ball recesses BR1 may also be disposed to face each other with respect to the lens assembly. Therefore, the first ball recess at one side may be connected to the first lens assembly through the first ball. In addition, the first ball recess at the other side may be connected to the second lens assembly through the second ball.

In addition, the first ball recess BR1 may include a stopper. For example, the first ball recess BR1 in which the first ball is seated may include a first stopper BS1. In addition, the first ball recess BR1 in which the second ball is seated may include a second stopper BS2. The first stopper may be positioned identically or differently from the second stopper in the second direction (Y-axis direction). For example, depending on driving distances or sizes of the first lens assembly and the second lens assembly, at least portions of the first stopper and the second stopper may or may not overlap each other in the second direction (Y-axis direction).

In addition, a length of the first ball recess BR1 in the optical axis direction (Z-axis direction) may be preset. Alternatively, a length of the second ball recess BR2 in the optical axis direction (Z-axis direction) may be preset. Therefore, moving distances of the first ball B1 and the second ball B2 in the optical axis direction in the first ball recess or the second ball recess may be adjusted. In other words, the first ball recess BR1 or the second ball recess BR2 may operate as stoppers for the first and second balls B1 and B2.

Figure 14:
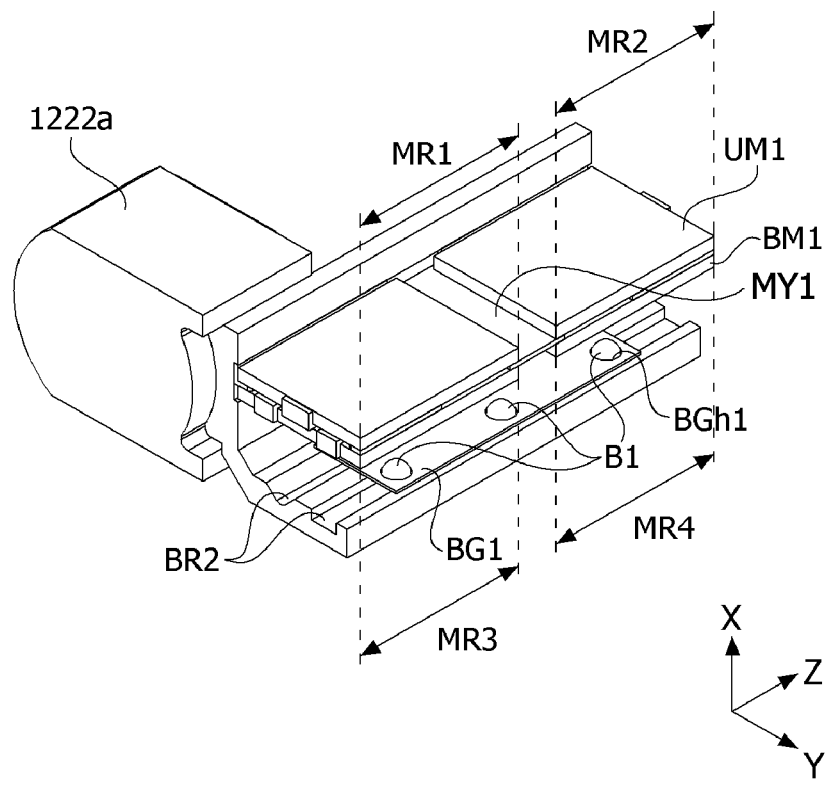
FIG. 14 is a perspective view of a first lens assembly and a second driving magnet, a second driving coil, a magnet yoke, a ball unit, and a ball guide unit, which are coupled to the first lens assembly, according to an embodiment.
Figure 15:
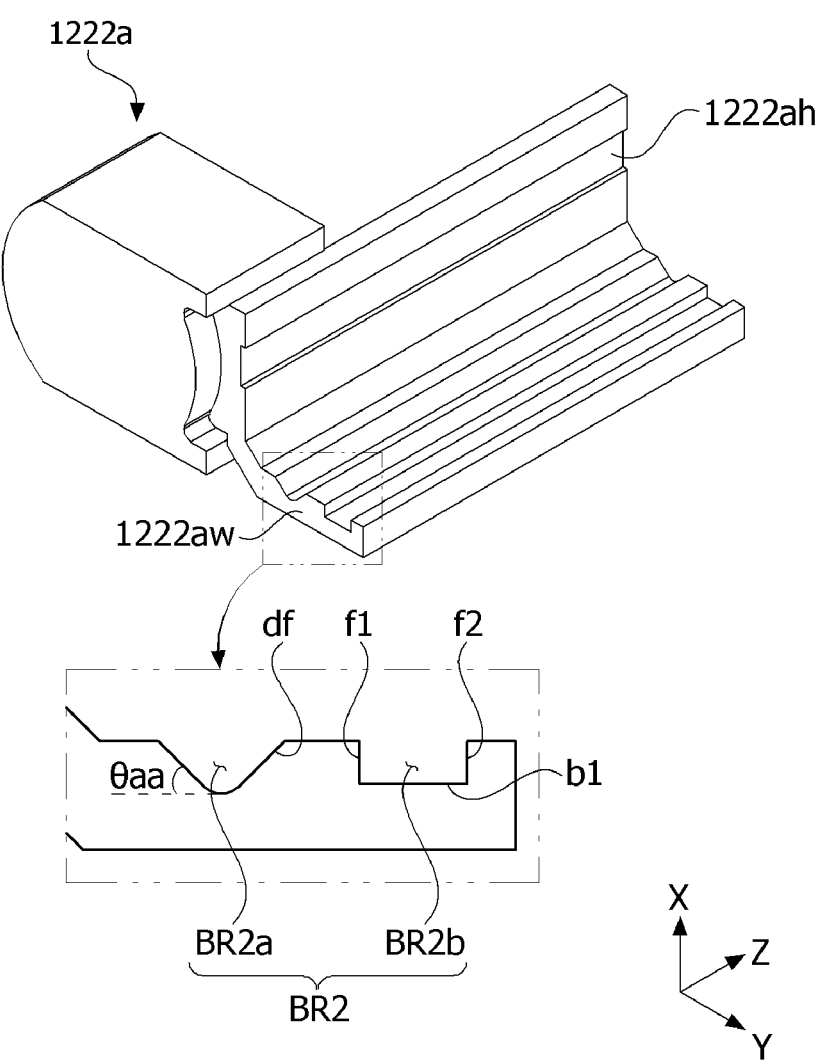
FIG. 15 is a perspective view of the first lens assembly according to the embodiment.
Figure 16:
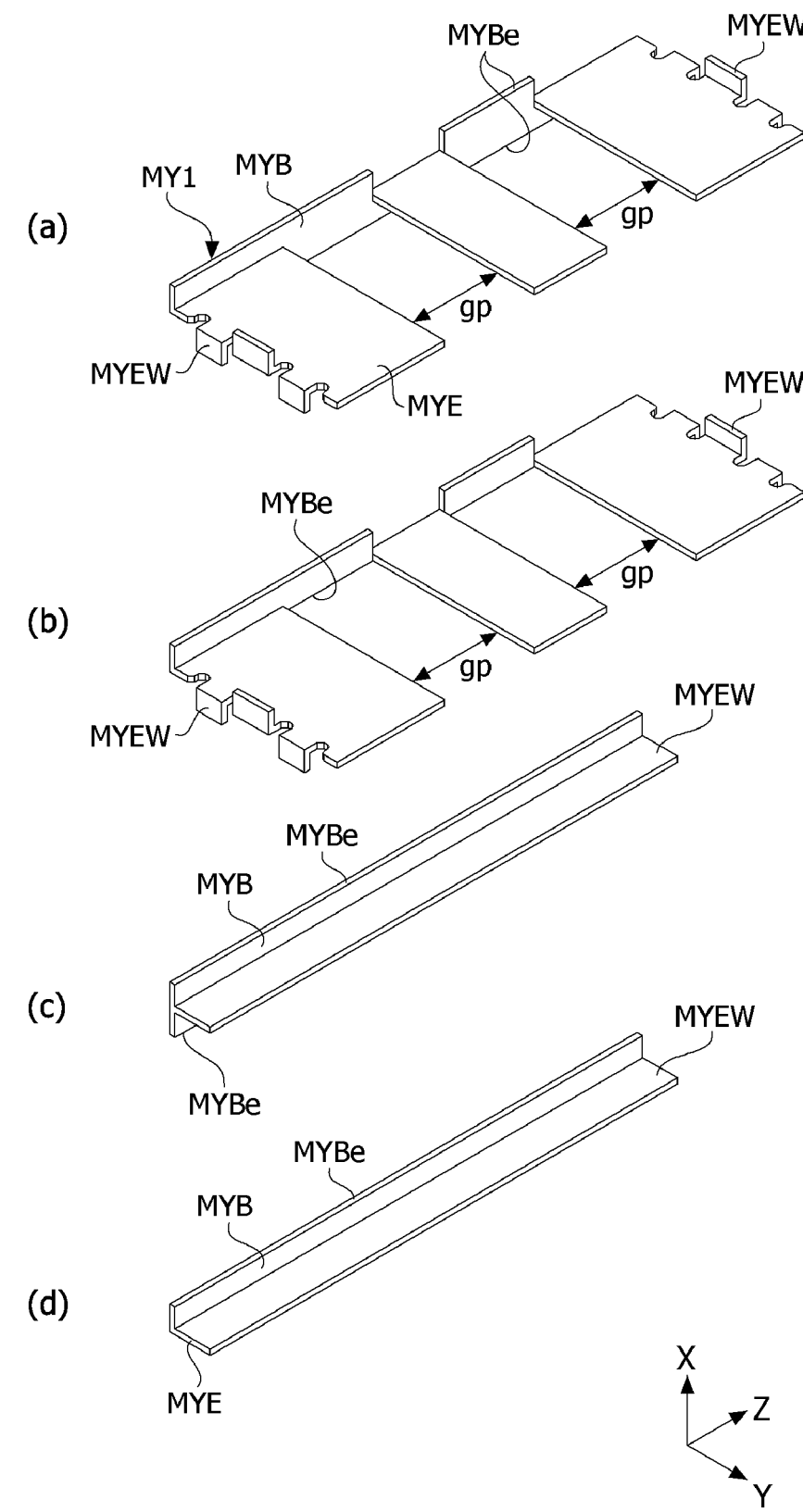
FIG. 16(a) to (d) is a perspective view of the magnet yoke according to the embodiment.
Figure 17:
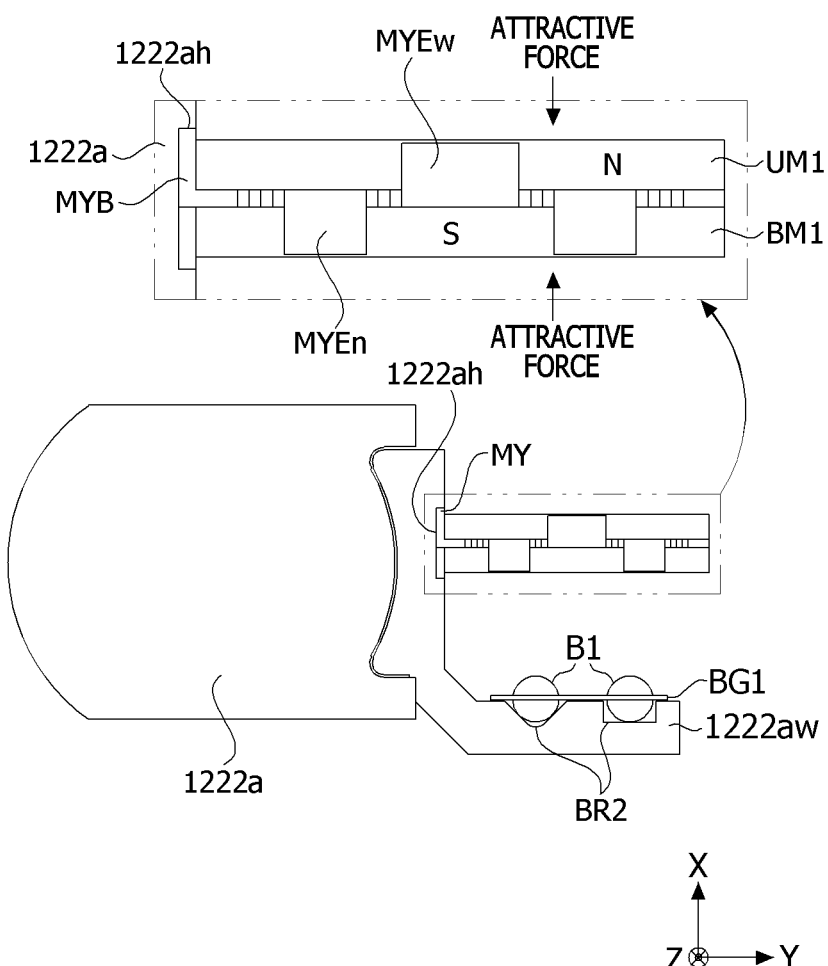
FIG. 17 is a front view of the first lens assembly and the magnet yoke, the ball unit, and the ball guide unit, which are coupled to the first lens assembly, according to the embodiment.
Figure 18:
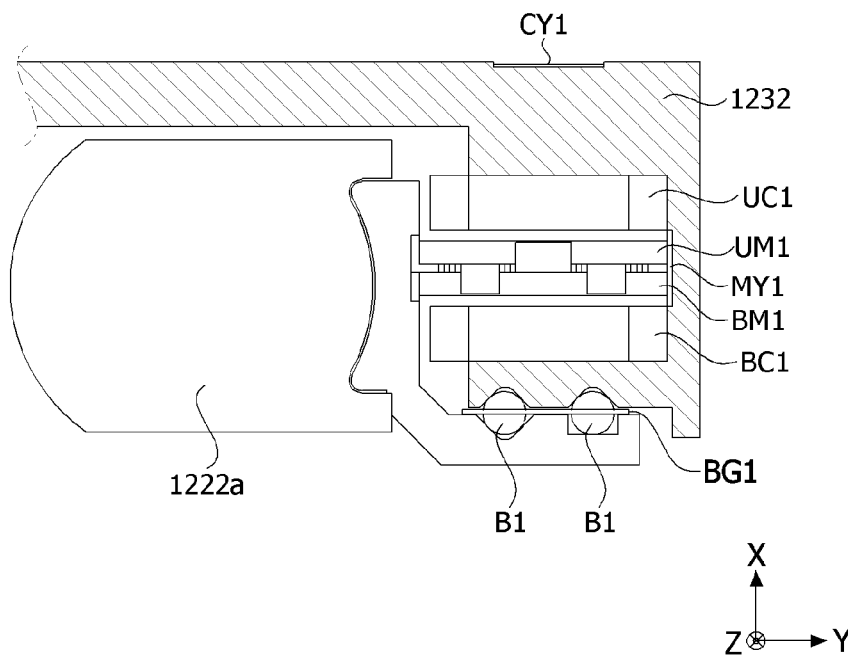
FIG. 18 is a front view of the first lens assembly and the second driving magnet, the second driving coil, the magnet yoke, the ball unit, the ball guide part, and a portion of the second housing, which are coupled to the first lens assembly, according to the embodiment.

FIG. 14 is a perspective view of a first lens assembly and a second drive magnet, a second drive coil, a magnet yoke, a ball part, and a ball guide part, which are coupled to the first lens assembly, according to an embodiment, FIG. 15 is a perspective view of the first lens assembly according to the embodiment, FIG. 16 is a perspective view of the magnet yoke according to the embodiment, FIG. 17 is a front view of the first lens assembly and the magnet yoke, the ball part, and the ball guide part, which are coupled to the first lens assembly, according to the embodiment, and FIG. 18 is a front view of the first lens assembly and the second drive magnet, the second drive coil, the magnet yoke, the ball part, the ball guide part, and a portion of the second housing, which are coupled to the first lens assembly, according to the embodiment.

Referring to FIGS. 14 and 15, in the second camera actuator according to the embodiment, the upper magnet and the bottom magnet may be disposed between the upper coil and the bottom coil and coupled to any one of the first lens assembly 1222a and the second lens assembly. The following description will be made based on the first lens assembly and components coupled thereto as illustrated.

Therefore, the first upper magnet UM1 and the first bottom magnet BM1 may be disposed between a first upper coil UC1 and a second bottom coil BC2. In addition, the first upper magnet UM1 and the first bottom magnet BM1 may be coupled to the first lens assembly 1222a.

In addition, at least portions of the upper magnet and the bottom magnet may overlap the upper coil, the bottom coil, and the ball unit in the vertical direction or the first direction (X-axis direction). In addition, the upper magnet and the bottom magnet may not overlap the lens or lens group in the vertical direction.

At least portions of the first upper magnet UM1 and the first bottom magnet BM1 may overlap the first upper coil UC1, the first bottom coil BC1, and the first ball B1 in the first direction (X-axis direction). In addition, the first upper magnet UM1 and the first bottom magnet BM1 may not overlap the first and second lens groups or lenses in the vertical direction (X-axis direction).

In addition, the first lens assembly 1222a and the second lens assembly may include the second ball recess BR2 facing the first ball recess.

The ball unit may be positioned or seated on the first ball recess and the second ball recess BR2. For example, the first ball B1 may be positioned between the first ball recess of the second housing and the second ball recess BR2 of the first lens assembly. In addition, the first ball B1 may be seated in the first ball recess of the second housing and the second ball recess BR2 of the first lens assembly.

In addition, the upper coil may be seated on a lower surface of the base, and the bottom coil may be seated on an upper surface of the second extension portion. For example, the first upper coil UC1 may be seated on the lower surface of the base, and the first bottom coil BC1 may be seated on the upper surface of the second extension portion.

The magnet yoke may be coupled to the first lens assembly 1222a or the second lens assembly 1222b and may extend outward. For example, the first magnet yoke MY1 may be coupled to the first lens assembly 1222a and may extend outward.

In addition, the magnet yoke may be a yoke. In addition, the magnet yoke may be a yoke having an attractive force with the upper/bottom magnets. In other words, positions of the upper/bottom magnets may be maintained by the magnet yoke.

A plurality of first ball recesses BR1 or second ball recesses BR2 facing the first ball recess BR1 may be provided and may have different shapes or the same shape. For example, the plurality of first ball recesses BR1 may have different shapes. In addition, the plurality of second ball recesses BR2 may have different shapes. The following description will be made based on the second ball recess.

For example, both side surfaces df of a first sub-recess BR2a of the second ball recess BR2 may be inclined at an inclination angle rather than an right angle. In contrast, a second sub-recess BR2b of the second ball recess BR2 may be a groove of which side surfaces f1 and f2 are perpendicular to a bottom surface b1. Therefore, the plurality of second ball recesses BR2 may have different groove shapes. Therefore, after the first ball is seated in the first and second ball recesses, the adjustment by a tolerance or the like may be easily made. Furthermore, the ball unit may be easily seated in the first and second ball recesses.

Further referring to FIGS. 16 and 17, the magnet yoke may include a yoke base MYB and a yoke extension portion MYE. The yoke base MYB may be seated in the yoke grooves of the outer surfaces of the first and second lens assemblies. The yoke groove may be positioned further inward than the second driving coil, the second driving magnet, and the first and second ball recesses.

Furthermore, the yoke extension portion MYE may be positioned on an end portion MYBe of the yoke base MYB. Alternatively, the yoke extension portion MYE may be positioned between both end portions MYBe of the yoke base MYB in the first direction. Therefore, it is possible to increase a coupling strength of the magnet yoke MY1 with the first lens assembly. Alternatively, the magnet yoke may be miniaturized in consideration of the attractive force between the coil yoke and the second driving magnet. Therefore, it is possible to reduce weights and costs.

Furthermore, a plurality of yoke extension portions MYE may be provided and spaced a predetermined distance gp from each other in the third direction (Z-axis direction).

In addition, both end portions of the yoke extension portion MYE in the third direction (Z-axis direction) may include yoke extension portion protrusions MYEw extending in the first direction (X-axis direction) to come into contact with both side surfaces of the second driving magnet.

In addition, the first magnet yoke MY1 coupled to the first lens assembly 1222a may have a non-divided integrated yoke extension portion MYE. With this configuration, it is possible to increase a coupling strength between the first magnet yoke MY1 and the second driving magnet.

In addition, the magnet yoke MY1 may be disposed between the base and the second extension portion.

Furthermore, the upper magnet may be disposed on the magnet yoke. The first upper magnet UM1 may be positioned on the first magnet yoke MY1. In addition, the bottom magnet may be positioned under the magnet yoke. In other words, the first bottom magnet BM1 may be positioned under the first magnet yoke MY1.

In addition, the upper magnet (e.g., the first upper magnet UM1) may include a first magnet region MR1 and a second magnet region MR2 disposed sequentially in the optical axis direction or the third direction (Z-axis direction).

The bottom magnet (e.g., the first bottom magnet BM1) may include a third magnet region and a fourth magnet region MR4 disposed sequentially in the optical axis direction.

The first magnet region MR1 and the third magnet region MR3 may overlap each other in the vertical direction and have different polarities. In addition, the second magnet region MR2 and the fourth magnet region MR4 may overlap each other in the vertical direction and have different polarities.

Therefore, the upper magnet and the bottom magnet may generate an attractive force with the yoke extension portion MYE of the magnet yoke interposed therebetween. Therefore, it is possible to increase a coupling strength between the second driving magnet and the magnet yoke. In other words, it is possible to improve the structural reliability of the second camera actuator.

In addition, a length of the second driving magnet in the optical axis direction may be larger than a length of the second driving coil in the optical axis direction. Therefore, it is possible to easily implement a long stroke. Furthermore, it is possible to suppress the generation of the counter electromotive force as much as possible, thereby improving the driving efficiency for movement in the third direction (Z-axis direction).

In addition, the ball guide unit (e.g., the first ball guide unit BG1) may come into contact with the ball unit (e.g., the first ball B1). For example, the first ball guide unit BG1 may include a ball guide hole BG1h. The first ball B1 may be positioned in the ball guide hole BG1h. In other words, the first ball B1 may pass through the first ball guide unit BG1. Therefore, it is possible to suppress the movement of the first ball B1. Furthermore, it is possible to maintain a certain distance between the plurality of first balls B1 in the third direction (Z-axis direction) or the second direction (Y-axis direction).

Referring to FIGS. 17 and 18, the coil yoke according to the embodiment may be positioned in the base or second extension portion. For example, the first coil yoke CY1 may be positioned in the base. Furthermore, at least a portion of the first coil yoke CY1 may overlap the first upper magnet UM1 and the second upper magnet UM2 in the first direction (X-axis direction). Furthermore, the first coil yoke CY1 may be positioned on the first ball B1, the second extension portion, the first bottom coil, the first bottom magnet, the first upper magnet, and the first upper coil, which are sequentially disposed upward.

In addition, at least a portion of the magnet yoke MY1 may overlap the base and the second extension portion in the vertical direction or the first direction (X-axis direction).

In addition, as described above, the first magnet region MR1 and the third magnet region MR3 may overlap each other in the vertical direction and have different polarities. In addition, the second magnet region MR2 and the fourth magnet region MR4 may overlap each other in the vertical direction and have different polarities. Therefore, it is possible to increase a coupling strength between the upper magnet and the bottom magnet. Therefore, it is possible to improve the structural reliability of the camera actuator.

Furthermore, corresponding to this configuration, directions of currents flowing in the upper coil (e.g., the first upper coil UC1) and the bottom coil (e.g., the first bottom coil BC1) may be opposite.

In addition, at least one upper coil and one bottom coil may be provided. Likewise, at least one first ball and one second ball may be provided.

Figure 19:
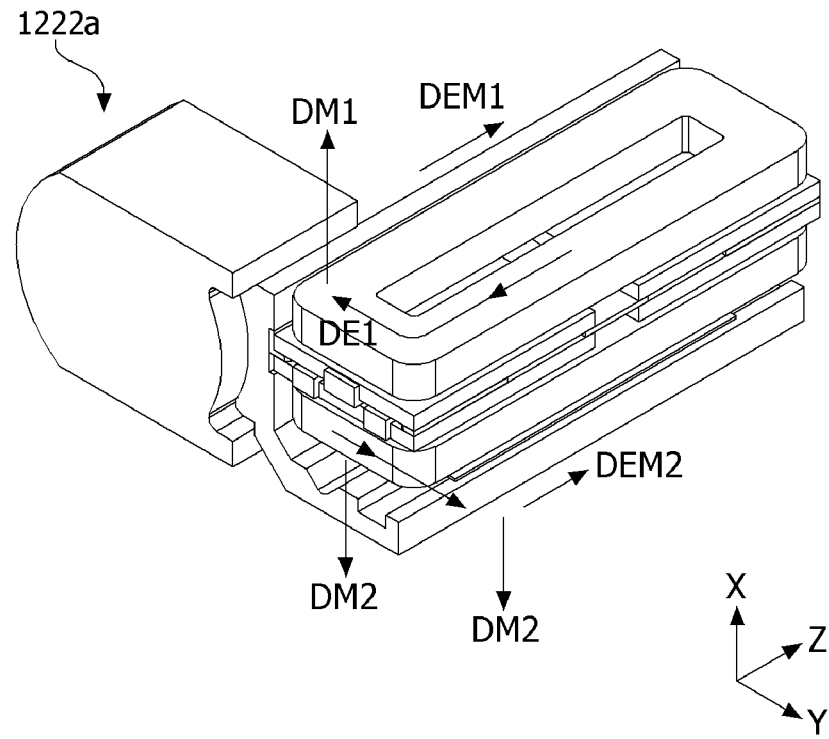
FIG. 19 is a view for describing each driving of the first lens assembly according to the embodiment.
Figure 20:
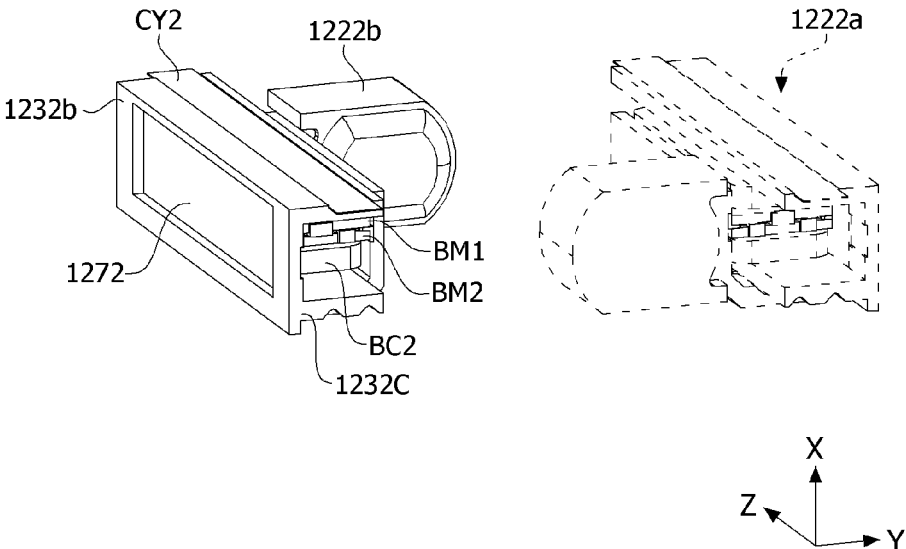
FIG. 20 is a perspective view of the first lens assembly and a second lens assembly according to the embodiment.
Figure 21:
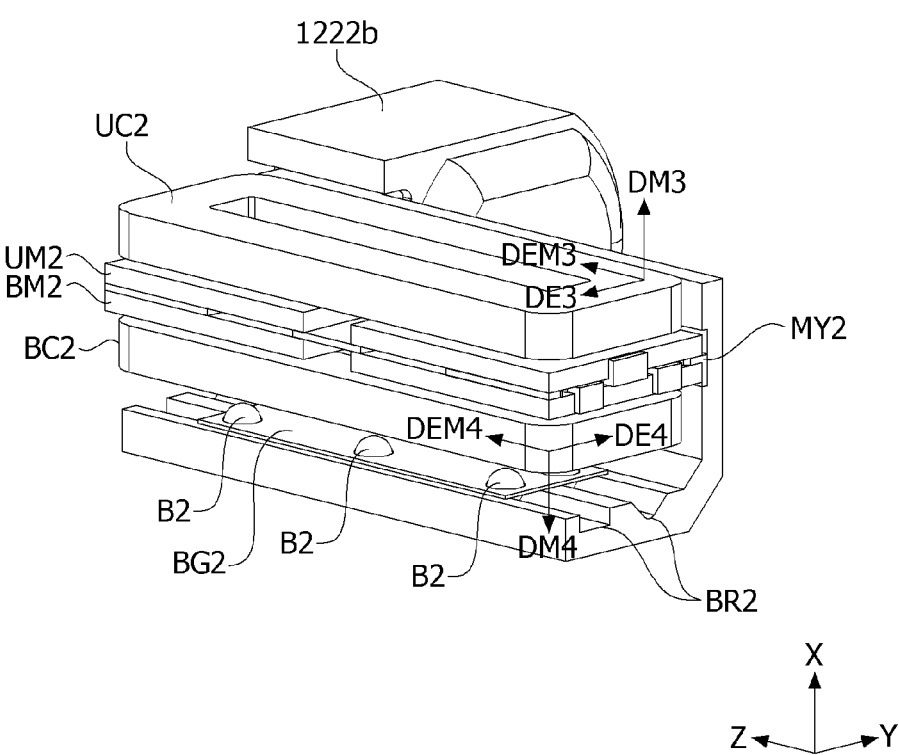
FIG. 21 is a view for describing each driving of the second lens assembly according to the embodiment.
Figure 22:
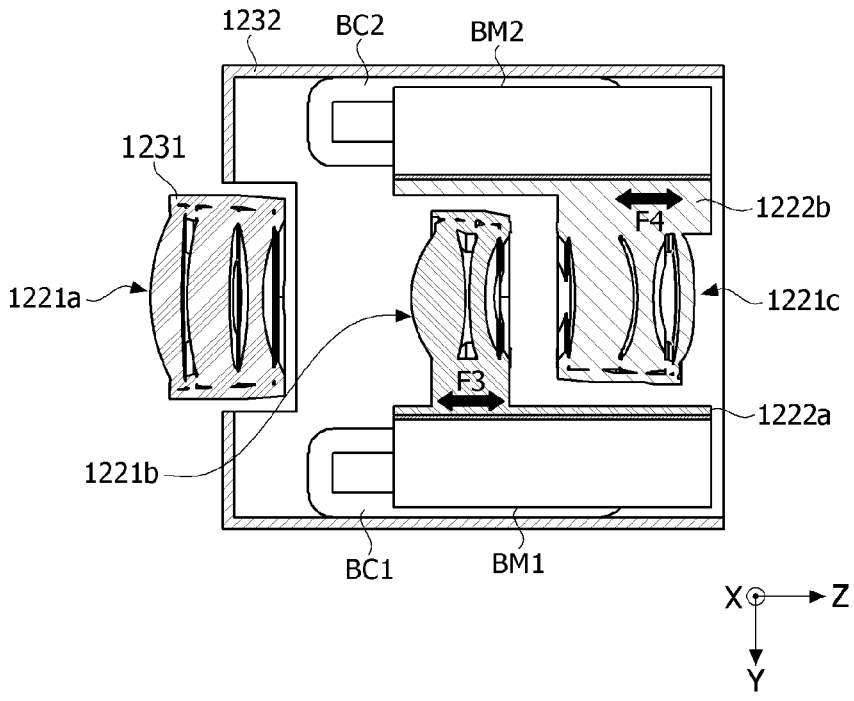
FIG. 22 is a view for describing a movement of the first lens assembly and the second lens assembly in the second camera actuator according to the embodiment.

FIG. 19 is a view for describing each driving of the first lens assembly according to the embodiment, FIG. 20 is a perspective view of the first lens assembly and a second lens assembly according to the embodiment, FIG. 21 is a view for describing each driving of the second lens assembly according to the embodiment, and FIG. 22 is a view for describing a movement of the first lens assembly and the second lens assembly in the second camera actuator according to the embodiment.

Referring to FIGS. 19 and 21, in the camera device or second camera actuator according to the embodiment, an electromagnetic force may be generated between the second driving coil and the second driving magnet to allow the first lens assembly 1222a or the second lens assembly 1222b to move horizontally or move in a direction parallel to the optical axis in the third direction (Z-axis direction) or a direction opposite to the third direction through the ball units B1 and B2.

Specifically, in the camera device according to the embodiment, the first upper magnet UM1 may be provided in the first lens assembly 1222a, for example, by a bipolar magnetization method. For example, in an embodiment, both an N pole and an S pole of the first upper magnet UM1 may be positioned to face the first upper coil UC1. Therefore, each of the S pole and the N pole of the first upper magnet UM1 may be disposed to correspond to a region of the first upper coil UC1 in which a current flows in the Y-axis direction or a direction opposite thereto.

In an embodiment, when a magnetic force DM1 is applied from the N pole of the first upper magnet UM1 in the first direction (X-axis direction) and a current DE1 flows in the first upper coil UC1 corresponding to the N pole in a direction opposite to the second direction (Y-axis direction), an electromagnetic force DEM1 may act in the third direction (Z-axis direction) according to the interaction of the electromagnetic force (e.g., a Fleming's left hand rule).

In addition, in an embodiment, when the magnetic force is applied from the S pole of the first upper magnet UM1 in a direction opposite to the first direction (X-axis direction) and the current DE1 flows in the first upper coil UC1 corresponding to the S pole in the second direction (Y-axis direction), the electromagnetic force DEM1 may act in the Z-axis direction according to the interaction of the electromagnetic force.

At this time, since the first upper coil UC1 is in a state of being fixed to the second housing, the first lens assembly 1222a in which the first upper magnet UM1 is disposed may be moved in a direction opposite to the third direction (Z-axis direction) by the electromagnetic force DEM1 according to a current direction.

In other words, the second driving magnet may move in an opposite direction of the electromagnetic force applied to the second driving coil. In addition, the direction of the electromagnetic force may be changed depending on the current of the coil and the magnetic force of the magnet.

Therefore, the first lens assembly 1222a may move along the first ball recess (rail) of the second housing through the first ball B1 in a direction (both directions) parallel to the third direction or the optical axis direction. In this case, the electromagnetic force DEM1 may be controlled in response to the current DE1 applied to the first upper coil UC1 and the magnitude of the magnetic force of the first upper magnet.

This may also be applied to the first bottom magnet BM1 and the first bottom coil BC1 in the same manner.

In the camera device according to the embodiment, the first bottom magnet BM1 may be provided in the first lens assembly 1222a, for example, by a bipolar magnetization method. For example, in an embodiment, both an N pole and an S pole of the first bottom magnet BM1 may be positioned to face the first bottom coil BC1. Therefore, each of the S pole and the N pole of the first bottom magnet BM1 may be disposed to correspond to a region of the first bottom coil BC1 in which a current flows in the Y-axis direction or a direction opposite thereto.

In an embodiment, when the magnetic force is applied from the N pole of the first bottom magnet BM1 in the first direction (X-axis direction) and the current DE2 flows in the first bottom coil BC1 corresponding to the N pole in a direction opposite to the second direction (Y-axis direction), the electromagnetic force DEM2 may act in the third direction (Z-axis direction) according to the interaction of the electromagnetic force (e.g., a Fleming's left hand rule).

In addition, in an embodiment, when the magnetic force is applied from the S pole of the first bottom magnet BM1 in a direction opposite to the first direction (X-axis direction) and the current DE2 flows in the first bottom coil BC1 corresponding to the S pole in the second direction (Y-axis direction), the electromagnetic force DEM2 may act in the Z-axis direction according to the interaction of the electromagnetic force.

At this time, since the first bottom coil BC1 is in a state of being fixed to the second housing, the first lens assembly 1222a in which the first bottom magnet BM1 is disposed may be moved in a direction opposite to the third direction (Z-axis direction) by the electromagnetic force DEM2 according to a current direction.

In other words, the second driving magnet may move in an opposite direction of the electromagnetic force applied to the second driving coil. In addition, the direction of the electromagnetic force may be changed depending on the current of the coil and the magnetic force of the magnet.

Therefore, the first lens assembly 1222a may move along the first ball recess (rail) of the housing through the first ball B1 in a direction (both directions) parallel to the third direction or the optical axis direction. In this case, the electromagnetic force DEM2 may be controlled in response to the current DE2 applied to the first bottom coil BC1 and the magnitude of the magnetic force of the first upper magnet.

Furthermore, since the upper magnet/bottom magnet generates the electromagnetic force in the same direction by the upper coil/bottom coil, it is possible to generate a force that provides a long stroke in the third direction even when the second driving coil and the second driving magnet are miniaturized. In other words, it is possible to improve a driving force or driving efficiency relative to a length.

The above-described driving may be applied to the second lens assembly in the same manner.

Specifically, in the camera device according to the embodiment, the second upper magnet UM2 may be provided in the second lens assembly 1222b, for example, by a bipolar magnetization method. For example, in an embodiment, both an N pole and an S pole of the second upper magnet UM2 may be positioned to face the second upper coil UC2. Therefore, each of the S pole and the N pole of the second upper magnet UM2 may be disposed to correspond to a region of the second upper coil UC2 in which a current flows in the Y-axis direction or a direction opposite thereto.

In an embodiment, when a magnetic force DM3 is applied from the N pole of the second upper magnet UM2 in the first direction (X-axis direction) and a current DE3 flows in the second upper coil UC2 corresponding to the N pole in a direction opposite to the second direction (Y-axis direction), an electromagnetic force DEM3 may act in the third direction (Z-axis direction) according to the interaction of the electromagnetic force (e.g., a Fleming's left hand rule).

In addition, in an embodiment, when the magnetic force is applied from the S pole of the second upper magnet UM2 in a direction opposite to the first direction (X-axis direction) and the current DE3 flows in the second upper coil UC2 corresponding to the S pole in the second direction (Y-axis direction), the electromagnetic force DEM3 may act in the Z-axis direction according to the interaction of the electromagnetic force.

At this time, since the second upper coil UC2 is in a state of being fixed to the second housing, the second lens assembly 1222b in which the second upper magnet UM2 is disposed may be moved in a direction opposite to the third direction (Z-axis direction) by the electromagnetic force DEM3 according to a current direction.

In other words, the second driving magnet may move in an opposite direction of the electromagnetic force applied to the second driving coil. In addition, the direction of the electromagnetic force may be changed depending on the current of the coil and the magnetic force of the magnet.

Therefore, the second lens assembly 1222b may move along the second ball recess (rail) of the housing through the second ball B2 in a direction (both directions) parallel to the third direction or the optical axis direction. In this case, the electromagnetic force DEM3 may be controlled in response to the current DE3 applied to the second upper coil UC2 and the magnitude of the magnetic force of the second upper magnet.

This may also be applied to the second bottom magnet BM2 and the second bottom coil BC2 in the same manner.

In the camera device according to the embodiment, the second bottom magnet BM2 may be provided in the second lens assembly 1222*b*, for example, by a bipolar magnetization method. For example, in an embodiment, both the N pole and the S pole of the second bottom magnet BM2 may be positioned to face the second bottom coil BC2. Therefore, each of the S pole and the N pole of the second bottom magnet BM2 may be disposed to correspond to a region of the second bottom coil BC2 in which a current flows in the Y-axis direction or a direction opposite thereto.

In an embodiment, when the magnetic force is applied from the N pole of the second bottom magnet BM2 in the first direction (X-axis direction) and the current DE4 flows in the second bottom coil BC2 corresponding to the N pole in a direction opposite to the second direction (Y-axis direction), an electromagnetic force DEM4 may act in the third direction (Z-axis direction) according to the interaction of the electromagnetic force (e.g., a Fleming's left hand rule).

In addition, in an embodiment, when the magnetic force is applied from the S pole of the second bottom magnet BM2 in a direction opposite to the first direction (X-axis direction) and the current DE4 flows in the second bottom coil BC2 corresponding to the S pole in the second direction (Y-axis direction), the electromagnetic force DEM4 may act in the Z-axis direction according to the interaction of the electromagnetic force.

At this time, since the second bottom coil BC2 is in a state of being fixed to the second housing, the second lens assembly 1222*b* in which the second bottom magnet BM2 is disposed may be moved in a direction opposite to the third direction (Z-axis direction) by the electromagnetic force DEM4 according to a current direction.

In other words, the second driving magnet may move in an opposite direction of the electromagnetic force applied to the second driving coil. In addition, the direction of the electromagnetic force may be changed depending on the current of the coil and the magnetic force of the magnet.

Therefore, the second lens assembly 1222*b* may move along the first ball recess (rail) of the housing through the second ball B2 in a direction (both directions) parallel to the third direction or the optical axis direction. In this case, the electromagnetic force DEM4 may be controlled in response to the current DE4 applied to the second bottom coil BC2 and the magnitude of the magnetic force of the second bottom magnet.

Furthermore, since the upper magnet/bottom magnet generates the electromagnetic force in the same direction by the upper coil/bottom coil, it is possible to generate a force that provides a long stroke in the third direction even when the second driving coil and the second driving magnet are miniaturized. In other words, it is possible to improve a driving force or driving efficiency relative to a length.

Therefore, directions of currents flowing in the upper coil and the bottom coil according to the present embodiment may be opposite. For example, when a current flows clockwise in the upper coil, the current may flow counterclockwise in the bottom coil. In this case, at least portions of the upper coil and the bottom coil overlap each other in the first direction.

Further referring to FIG. 20, the first upper magnet UM1 and the first bottom magnet BM1 may be disposed between the first upper coil UC1 and the second bottom coil BC2. In addition, the first upper magnet UM1 and the first bottom magnet BM1 may be coupled to the first lens assembly 1222*a*.

In addition, at least portions of the upper magnet and the bottom magnet may overlap the upper coil, the bottom coil, and the ball unit in the vertical direction or the first direction (X-axis direction). In addition, the upper magnet and the bottom magnet may not overlap the lens or lens group in the vertical direction.

At least portions of the first upper magnet UM1 and the first bottom magnet BM1 may overlap the first upper coil UC1, the first bottom coil BC1, and the first ball B1 in the first direction (X-axis direction). In addition, the first upper magnet UM1 and the first bottom magnet BM1 may not overlap the first and second lens groups or lenses in the vertical direction (X-axis direction).

In addition, the first lens assembly 1222*a* and the second lens assembly may include the second ball recess BR2 facing the first ball recess.

The ball units B1 and B2 may be positioned or seated in the first ball recess and the second ball recess BR2. For example, the first ball B1 may be positioned between the first ball recess of the second housing and the second ball recess BR2 of the first lens assembly. In addition, the first ball B1 may be seated in the first ball recess of the second housing and the second ball recess BR2 of the first lens assembly.

Referring to FIG. 22, in the camera device according to the embodiment, the second driving unit may provide driving forces F3 and F4 that move the first lens assembly 1222*a* and the second lens assembly 1222*b* of the lens unit 1220 in the third direction (Z-axis direction). As described above, the second driving unit may include the second driving coil 1252 and the second driving magnet 1251. In addition, the lens unit 1220 may be moved by the electromagnetic force generated between the second driving coil 1252 and the second driving magnet 1251 in the third direction (Z-axis direction).

The first upper coil and the first bottom coil may be electrically connected to the first board 1271. The second upper coil and the second bottom coil may be electrically connected to the second board 1272. Therefore, the second driving coil may receive a driving signal (e.g., a current) from a driving driver on the circuit board of the circuit board 1300 through the second board unit 1270.

Therefore, the second lens group 1221*b* seated in the first lens assembly 1222*a* may also move in the third direction. In addition, the third lens group 1221*c* seated on the second lens assembly 1222*b* may also move in the third direction.

Therefore, as described above, a focal length or magnification of the optical system may be changed by moving the second lens group 1221*b* and the third lens group 1221*c*. In the embodiment, the magnification may be changed by moving the second lens group 1221*b*. In other words, zooming may be performed. In addition, a focus may be adjusted by moving the third lens group 1221*c*. In other words, auto focusing may be performed. With this configuration, the second camera actuator may be a fixed zoom or a continuous zoom.

Figure 23:
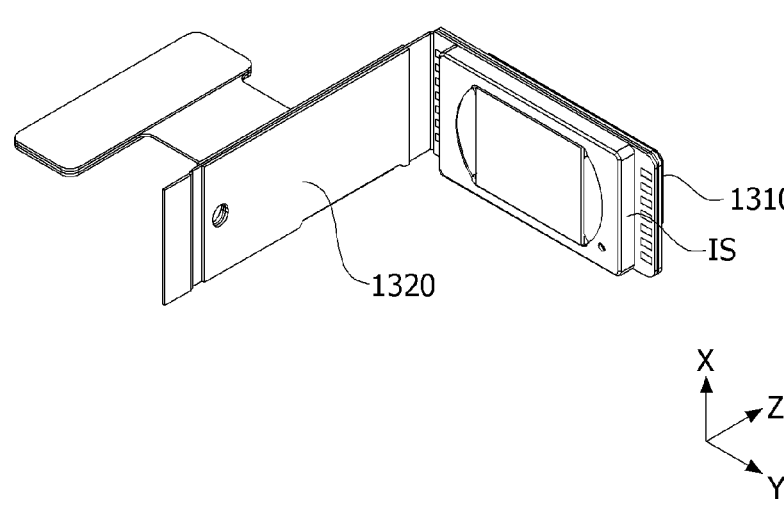
FIG. 23 is a schematic diagram illustrating a circuit board according to the embodiment.

FIG. 23 is a schematic diagram illustrating a circuit board according to the embodiment.

Referring to FIG. 23, as described above, the circuit board 1300 according to the embodiment may include a first circuit board unit 1310 and a second circuit board unit 1320. The first circuit board unit 1310 may be positioned under the base and coupled to the base. In addition, the image sensor IS may be disposed on the first circuit board unit 1310. In addition, the first circuit board unit 1310 and the image sensor IS may be electrically connected.

In addition, the second circuit board unit 1320 may be positioned on a side portion of the base. In particular, the second circuit board unit 1320 may be positioned on a first side portion of the base. Therefore, the second circuit board unit 1320 may be positioned adjacent to the fourth coil positioned adjacent to the first side portion, and thus an electrical connection is easy.

Furthermore, the circuit board 1300 may further include a fixed board (not illustrated) positioned on a side surface thereof. Therefore, even when the circuit board 1300 is made of a flexible material, the circuit board 1300 may be coupled to the base while maintaining stiffness by the fixed board.

The second circuit board unit 1320 of the circuit board 1300 may be positioned on the side portion of the second driving unit 1250. The circuit board 1300 may be electrically connected to the first driving unit and the second driving unit. For example, the electrical connection may be made by the SMT. However, the present invention is not limited to this method.

The circuit board 1300 may include a circuit board having wiring patterns that may be electrically connected, such as a rigid PCB, a flexible PCB, and a rigid flexible PCB. However, the present invention is not limited to these types.

In addition, the circuit board 1300 may be electrically connected to another camera module in the terminal or a processor of the terminal. Therefore, the above-described camera actuator and camera device including the same may transmit and receive various signals in the terminal.

Figure 24:
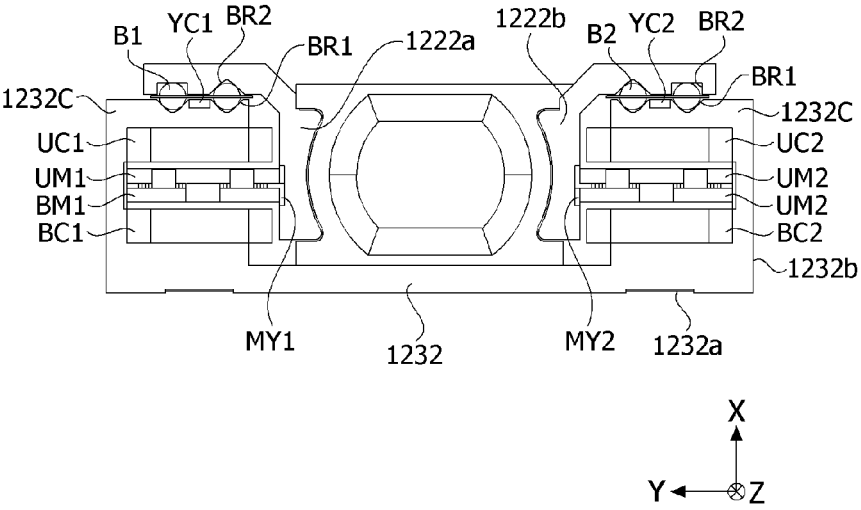
FIG. 24 is a front view of a second camera actuator according to a second embodiment.

FIG. 24 is a front view of a second camera actuator according to a second embodiment.

The second camera actuator according to the second embodiment may include the lens unit, the second housing 1230, the second driving unit, the base unit, the second board unit, the magnet yokes MY1 and MY2, the coil yokes CY1 and CY2, and the ball units B1 and B2. Furthermore, the second camera actuator according to the second embodiment may include the second shield can (not illustrated), the elastic unit (not illustrated), and the bonding member (not illustrated). In addition, the second camera actuator may include the ball guide unit.

In other words, all of the above-described contents of the second camera actuator except for contents to be described below of the second camera actuator according to the second embodiment may be applied in the same manner.

In the second camera actuator according to the second embodiment, the base 1232a, the bottom coils BC1 and BC2, the bottom magnets BM1 and BM2, the upper magnets UM1 and UM2, the upper coils UC1 and UC2, and the coil yokes CY1 and CY2 of the second housing 1232 may be disposed sequentially in the first direction (X-axis direction).

In the second camera actuator according to the second embodiment, the ball units B1 and B2 may be positioned opposite to the coil yokes with respect to the second driving coil and the second driving magnet.

In contrast, in the second camera actuator according to the second embodiment, the coil yokes CY1 and CY2 may be adjacent to the ball units B1 and B2 and positioned on the upper coils UC1 and UC2. The ball units B1 and B2 may also be positioned on the upper coils UC1 and UC2.

Furthermore, at least portions of the coil yokes CY1 and CY2 may overlap the ball units B1 and B2 in the second direction (Y-axis direction).

For example, the coil yokes CY1 and CY2 may be positioned between the first ball recesses BR1 of the second housing 1232. Therefore, the attractive force between the coil yokes CY1 and CY2 and the second driving magnet in the second extension portion 1232c of the second housing 1232 may act to maintain the coupling between the second housing 1232 and the first and second lens assemblies 1222a and 1222b.

In addition, the coil yokes CY1 and CY2 may be positioned on the upper surface or lower surface of the second extension portion 1232c of the second housing as described above. In addition, the coil yokes CY1 and CY2 may be positioned inside the second extension portion 1232c of the second housing.

When the coil yokes CY1 and CY2 are positioned on the lower surface of the second extension portion 1232c, the coil yokes CY1 and CY2 may not overlap the first ball recess BR1 in the second direction (Y-axis direction). Furthermore, when the coil yokes CY1 and CY2 are positioned on the lower surface of the second extension portion 1232c, the coil yokes CY1 and CY2 may not overlap the ball units B1 and B2 in the second direction (Y-axis direction). However, it is possible to increase a coupling strength between the upper coil and the second driving magnet. Therefore, it is possible to increase a friction force applied to the ball unit. Therefore, it is possible to improve driving accuracy.

Figure 25:
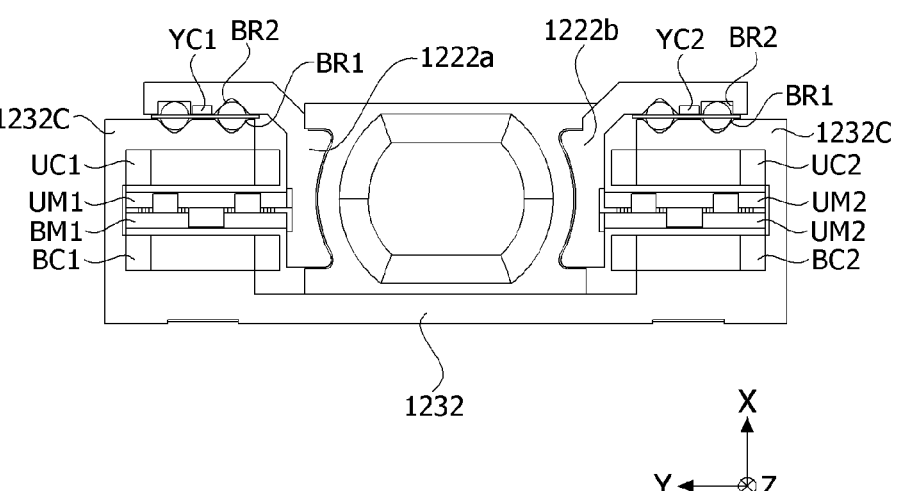
FIG. 25 is a front view of a second camera actuator according to a third embodiment.

FIG. 25 is a front view of a second camera actuator according to a third embodiment.

The second camera actuator according to the third embodiment may include the lens unit, the second housing 1230, the second driving unit, the base unit, the second board unit, the magnet yokes MY1 and MY2, the coil yokes CY1 and CY2, and the ball units B1 and B2. Furthermore, the second camera actuator according to the third embodiment may include the second shield can (not illustrated), the elastic unit (not illustrated), and the bonding member (not illustrated). In addition, the second camera actuator may include the ball guide unit.

In other words, all of the above-described contents of the second camera actuator except for contents to be described below of the second camera actuator according to the third embodiment may be applied in the same manner.

In the second camera actuator according to the third embodiment, the base 1232a, the bottom coils BC1 and BC2, the bottom magnets BM1 and BM2, the upper magnets UM1 and UM2, the upper coils UC1 and UC2, and the coil yokes CY1 and CY2 of the second housing 1232 may be disposed sequentially in the first direction (X-axis direction).

In the second camera actuator according to the third embodiment, the ball units B1 and B2 may be positioned opposite to the coil yokes with respect to the second driving coil and the second driving magnet.

In contrast, in the second camera actuator according to the third embodiment, the coil yokes CY1 and CY2 may be adjacent to the ball units B1 and B2 and positioned on the upper coils UC1 and UC2. The ball units B1 and B2 may also be positioned on the upper coils UC1 and UC2.

Furthermore, at least portions of the coil yokes CY1 and CY2 may overlap the ball units B1 and B2 in the second direction (Y-axis direction).

For example, the coil yokes CY1 and CY2 may be positioned between the second ball recesses BR2 of the first and second lens assemblies. Therefore, the attractive force between the second driving magnet under the coil yokes CY1 and CY2 and the coil yokes CY1 and CY2 may act to maintain the coupling between the second housing 1232 and the first and second lens assemblies 1222a and 1222b.

In addition, the coil yokes CY1 and CY2 may be positioned in the assembly guide unit of the lens assembly as described above. Therefore, as described above, the coil yokes CY1 and CY2 may be positioned on the lower surface of the assembly guide unit, and at least portions thereof may overlap the second ball recess BR2 in the second direction (Y-axis direction).

In addition, the coil yokes CY1 and CY2 may be positioned on the upper surface of or inside the assembly guide unit. For example, when the coil yokes CY1 and CY2 are positioned on the upper surface of the assembly guide unit, the coil yokes CY1 and CY2 may not overlap the second ball recess BR2 in the second direction (Y-axis direction). Furthermore, when the coil yokes CY1 and CY2 are positioned inside the assembly guide unit, the coil yokes CY1 and CY2 may not overlap the ball units B1 and B2 in the second direction (Y-axis direction). However, the coil yokes CY1 and CY2 may provide the structural coupling and the attractive force to all of the second housing, the second driving coil, and the second driving magnet in the lens assembly. Therefore, it is possible to improve the reliability of the second camera actuator and increase the friction force applied to the ball unit. Therefore, it is possible to improve driving accuracy.

Figure 26:
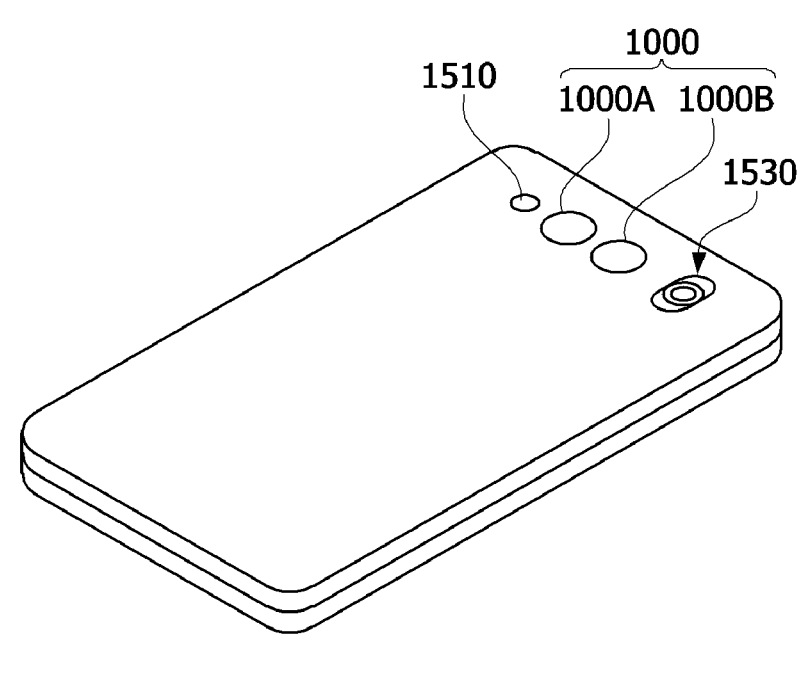
FIG. 26 is a perspective view of a mobile terminal to which the camera device according to the embodiment is applied.

FIG. 26 is a perspective view of a mobile terminal to which the camera device according to the embodiment is applied.

Referring to FIG. 26, a mobile terminal 1500 according to the embodiment may include the camera device 1000, a flash module 1530, and an AF device 1510, which are provided on a rear surface thereof.

The camera device 1000 may include an image photographing function and an AF function. For example, the camera device 1000 may include the AF function using an image.

The camera device 1000 processes an image frame of a still image or a moving image obtained by an image sensor in a photographing mode or a video call mode.

The processed image frame may be displayed on a predetermined display and stored in a memory. A camera (not illustrated) may also be disposed on a front surface of a body of the mobile terminal.

For example, the camera device 1000 may include a first camera device 1000A and a second camera device 1000B, and the first camera device 1000A may implement an OIS function together with an AF or zooming function. In addition, the second camera device 1000B may implement the AF, zooming, and OIS functions. In this case, since the first camera device 1000A includes both the above-described first camera actuator and second camera actuator, it is possible to easily miniaturize the camera device by changing an optical path.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition in which the AF function using the image of the camera device 1000 is degraded, for example, in an environment that is close to 10 m or less or dark.

The AF device 1510 may include a light emitting unit including a vertical cavity surface emitting laser (VCSEL) semiconductor device and a light receiving unit for converting light energy into electrical energy, such as a photodiode.

Figure 27:
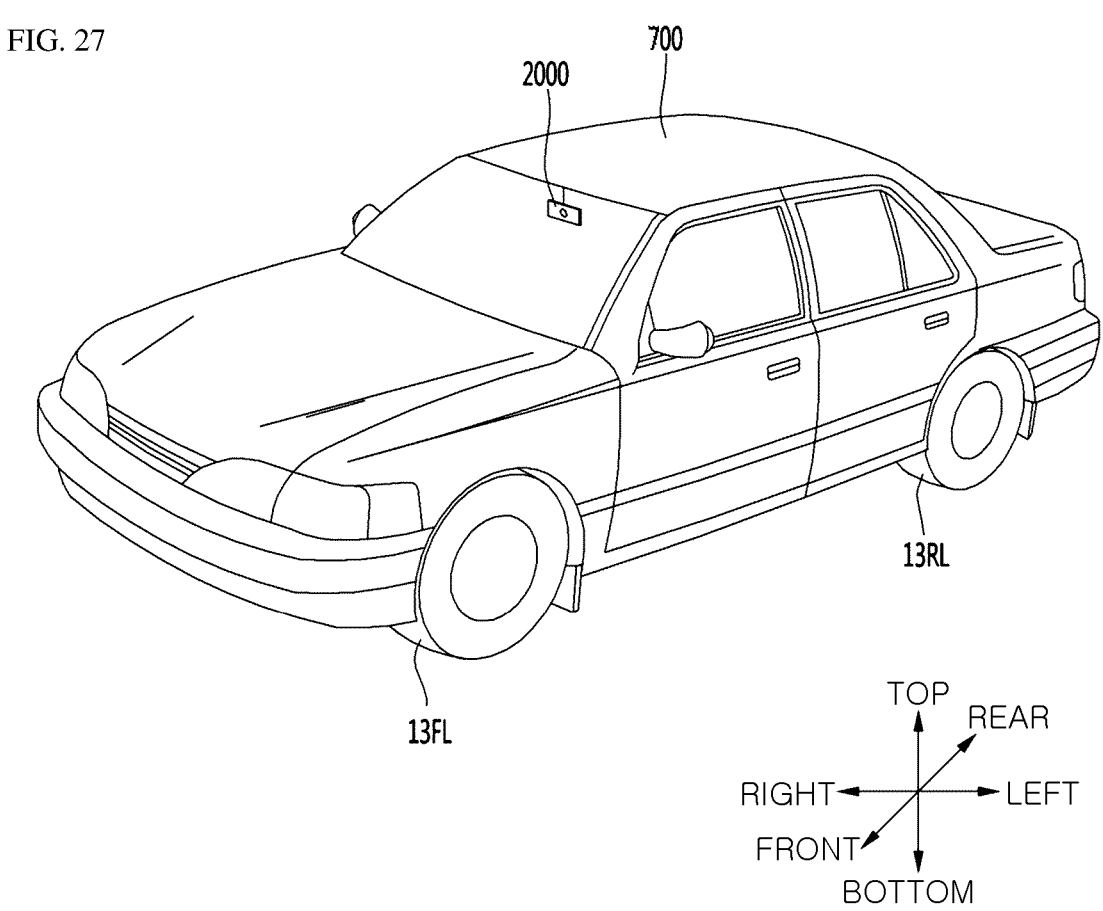
FIG. 27 is a perspective view of a vehicle to which the camera device according to the embodiment is applied.

FIG. 27 is a perspective view of a vehicle to which the camera device according to the embodiment is applied.

For example, FIG. 27 is a view illustrating an exterior of a vehicle including a vehicle driver assistance device to which the camera device 1000 according to the embodiment is applied.

Referring to FIG. 27, a vehicle 700 according to the embodiment may include wheels 13FL and 13FR rotated by a power source and a predetermined sensor. Although the sensor may be a camera sensor 2000, the present invention is not limited thereto.

The camera sensor 2000 may be a camera sensor to which the camera device 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 2000, the processor may detect the object and include the detected object in the image information. In this case, the processor may further supplement the image information by acquiring information on a distance from the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 2000 may include a stereo camera in order to improve the measurement accuracy of the object and further secure information such as a distance between the vehicle 700 and the object, but the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator comprising:
   a housing;
   a first lens assembly and a second lens assembly configured to move in an optical axis direction with respect to the housing;
   a driving unit configured to move the first lens assembly and the second lens assembly; and a ball unit disposed between the first lens assembly and the housing and between the second lens assembly and the housing, wherein the driving unit includes a driving coil and a driving magnet facing the driving coil, wherein the driving magnet includes a first magnet and a second magnet, wherein the driving coil includes a first coil facing the first magnet and a second coil facing the second magnet, and wherein the first magnet and the second magnet are disposed between the first coil and the second coil and coupled to any one of the first lens assembly and the second lens assembly.

2. The camera actuator of claim 1, wherein the housing includes a base, a first extension portion extending in a direction perpendicular to the base, and a second extension portion extending inward from the first extension portion.

3. The camera actuator of claim 2, wherein the second extension portion overlaps the base in a vertical direction.

4. The camera actuator of claim 2, wherein the driving coil is disposed between the base and the second extension portion.

5. The camera actuator of claim 2, wherein the first coil is seated on a lower surface of the base, and wherein the second coil is seated on an upper surface of the second extension portion.

6. The camera actuator of claim 2, wherein the second extension portion includes a first ball recess in a lower surface thereof.

7. The camera actuator of claim 6, wherein the first lens assembly and the second lens assembly include a second ball recess facing the first ball recess.

8. The camera actuator of claim 7, wherein the ball unit is positioned in the first ball recess and the second ball recess.

9. The camera actuator of claim 6, wherein the first ball recess includes a stopper.

10. The camera actuator of claim 2, comprising a coil yoke disposed on the base, the second extension portion, or the first lens assembly/second lens assembly.

11. The camera actuator of claim 2, comprising a coil yoke disposed on any one of the base, the second extension portion, the first lens assembly, and the second lens assembly.

12. The camera actuator of claim 11, wherein the magnet yoke is disposed between the base and the second extension portion.

13. The camera actuator of claim 11, wherein at least a portion of the magnet yoke overlaps the base and the second extension portion in the vertical direction.

14. The camera actuator of claim 11, wherein the first magnet is disposed on the magnet yoke, and the second magnet is disposed under the magnet yoke.

15. The camera actuator of claim 1, wherein the first magnet includes a first magnet region and a second magnet region disposed sequentially in the optical axis direction, and wherein the second magnet includes a third magnet region and a fourth magnet region disposed sequentially in the optical axis direction.

16. The camera actuator of claim 15, wherein the first magnet region and the third magnet region overlap each other in the vertical direction and have different polarities, and wherein the second magnet region and the fourth magnet region overlap each other in the vertical direction and have different polarities.

17. The camera actuator of claim 15, wherein a length of the driving magnet in the optical axis direction is larger than a length of the driving coil in the optical axis direction.

18. The camera actuator of claim 15, wherein directions of currents flowing in the first coil and the second coil are opposite.

19. The camera actuator of claim 1, wherein the camera actuator includes a ball guide unit in contact with at least a part of the ball unit.

20. A camera actuator comprising:

a housing, a lens assembly configured to move in an optical axis direction with respect to the housing and including a lens, a driving unit configured to move the lens assembly, and a ball unit disposed between the lens assembly and the housing, wherein the driving unit includes a driving coil and a driving magnet facing the driving coil, wherein the driving magnet includes an upper magnet, and a bottom magnet disposed under the upper magnet, wherein the driving coil includes an upper coil facing the upper magnet, and a bottom coil facing the bottom magnet, and wherein at least portions of the upper magnet and the bottom magnet overlap the upper coil, the bottom coil, and the ball unit in a vertical direction and do not overlap the lens in the vertical direction.

\*    \*    \*    \*    \*